United States Patent [19]

Olstowski et al.

[11] 4,098,733

[45] Jul. 4, 1978

[54] COMPOSITES OF POLYURETHANES AND VINYL POLYMERS

[75] Inventors: Franciszek Olstowski, Freeport; Donald B. Parrish, Lake Jackson, both of Tex.

[73] Assignee: The Dow Chemical Company, Midland, Mich.

[21] Appl. No.: 799,480

[22] Filed: May 23, 1977

Related U.S. Application Data

[63] Continuation-in-part of Ser. No. 592,854, Jul. 2, 1975, abandoned.

[51] Int. Cl.² .............................................. C08G 18/14

[52] U.S. Cl. .................................... 521/123; 260/858; 260/859 R; 521/137; 521/131; 528/55; 260/37 N

[58] Field of Search ................... 260/2.5 BE, 2.5 AE, 260/858, 859 R, 77.5 CR, 77.5 AM

[56] References Cited

U.S. PATENT DOCUMENTS

| | | | |
|---|---|---|---|
| 3,523,093 | 8/1970 | Stamberger | 260/2.5 BE |
| 3,700,752 | 10/1972 | Hutchinson | 260/859 R |
| 3,753,933 | 8/1973 | Olstowski et al. | 260/2.5 AE |
| 3,763,065 | 10/1973 | Hermann et al. | 260/859 R |
| 3,773,697 | 11/1973 | Olstowski | 260/18 TN |
| 3,859,381 | 1/1975 | Hutchinson | 260/859 R |
| 3,868,431 | 2/1975 | Hutchinson | 260/859 R |
| 3,869,413 | 3/1975 | Blankenship | 260/2.5 BE |
| 3,886,229 | 5/1975 | Hutchinson et al. | 260/859 R |
| 3,935,132 | 1/1976 | Gerkin et al. | 260/858 |
| 3,939,222 | 2/1976 | Dieterich | 260/858 |

FOREIGN PATENT DOCUMENTS

| | | |
|---|---|---|
| 1,308,637 | 2/1973 | United Kingdom. |

OTHER PUBLICATIONS

Derwent Abstract (06533W/04) of Japanese publications J49109–496 and J49109–500.

*Primary Examiner*—Eugene C. Rzucidlo
*Attorney, Agent, or Firm*—James G. Carter

[57] ABSTRACT

Polyurethane and vinyl polymer composites are rapidly prepared without the requirement of the application of an external source of heat by the admixture of a composition comprising (A) a polyether polyol having an equivalent weight of 30–250, such as an adduct of glycerine with propylene oxide;

(B) an organic polyisocyanate, such as toluene diisocyanate;

(C) an ethylenically unsaturated monomer, such as styrene;

(D) a catalyst for polymerizing ethylenically unsaturated monomers such as tertiary butyl perbenzoate; and (E) a catalyst for urethane formation such as lead octoate.

Foams may also be prepared by adding an appropriate foaming agent.

32 Claims, No Drawings

COMPOSITES OF POLYURETHANES AND VINYL POLYMERS

CROSS-REFERENCE TO RELATED APPLICATION

This is a continuation-in-part of our copending application Ser. No. 592,854 filed July 2, 1975, now abandoned.

This invention relates to polyurethane/vinyl polymer composite articles, to a process for their preparation and to compositions which when admixed with suitable catalysts rapidly produce such composite articles.

Polyurethane/vinyl polymer composites have heretofore been proposed by a preparation which is considerably time consuming such as the methods proposed in U.S. Pat. No. 3,700,752.

U.S. Pat. No. 3,700,752 discloses a two-step process of completely gelling the polyurethane before allowing the vinyl monomer to polymerize in the preparation of shaped polymeric articles. This patent also states that it has been proposed to produce shaped articles from a composition comprising a vinyl monomer and the precursors of a crosslinked polyurethane by simultaneously polymerizing the vinyl monomer and gelling the crosslinked polyurethane. However, the patent states that this procedure suffers from the disadvantage that it may lead to phase separation between the polyurethane and the vinyl polymer.

By contrast, the present invention describes a process wherein the urethane and vinyl polymerization occurs essentially simultaneously to yield products which are capable of being removed from the mold within about 15 minutes or less, preferably in less than about 5 to 10 minutes after complete admixture of all of the ingredients (without the necessity of the application of an external source of heat) and upon cooling to room temperature can be employed immediately for its intended purpose.

The compositions described in this application are well suited to the rapid serial production of cellular or noncellular, non-elastomeric (elongation less than 100%) articles such as, for example, furniture components, ornamental or decorative objects, piping elements, machine components, or structural members from a limited number of molds.

These compositions also afford local energy conservation since it is not necessary to preheat the reactants nor expose the resin products to thermal curing cycles, although in some instances this may be desirable.

It has now been discovered that articles of polyurethane/vinyl polymer composites can be prepared within a period of about 15 minutes after admixture of the components of the composites without the necessity of the use of an external source of heat.

The term vinyl monomer employed herein means a polymerizable, ethylenically unsaturated monomer.

The term vinyl polymer as employed herein means a polymer prepared from one or more of such vinyl monomers.

The term non-cellular means that the product is not a foam.

The term cellular means that the product is a foam, i.e., it contains gas-filled cells of relatively uniform size.

The term non-elastomeric means that the product has an elongation value of less than about 100%.

The term urethane/vinyl polymer composite means that the product is a mixture of two substantially independent polymer systems, one being a polyurethane, the other being a vinyl polymer, which are incapable of separation by physical means.

The process of the present invention for preparing non-cellular polyurethane/vinyl polymer composite articles having a density of at least about 1 g/cc, a percent elongation of less than about 100 and which can be demolded and used for its intended purpose, after cooling to a suitable handling temperature, within a period of about 15 minutes or less without the application of an external source of heat, comprises (I) admixing the components of a composition comprising (A) a liquid polyol, or mixture of such polyols, preferably essentially free from ethylenic unsaturation having from about 2 to about 8 hydroxyl groups and an OH equivalent weight of from about 30 to about 250, preferably from about 50 to about 200;

(B) an organic polyisocyanate, preferably essentially free from ethylenic unsaturation, having an NCO equivalent weight of less than about 300, preferably less than about 250, with the proviso that when component (A) has an average of about 2 hydroxyl groups per molecule, said polyisocyanate has an average of at least about 2.5 NCO groups per molecule;

(C) a liquid ethylenically unsaturated monomer, preferably free from groups reactive with components (A) or (B), having an atmospheric boiling point above about 80° C, preferably above about 100° C and most preferably above about 120° C, or a mixture of such monomers;

(D) an effective quantity of a suitable catalyst for polymerizing component (C);

(E) an effective quantity of a suitable catalyst for urethane formation; and (F) from 0 to about 50% by weight based upon the combined weight of components (A), (B), (C), (D), (E) and (F) of a modifier substance free from groups reactive with components (A), (B) or (C) at the conditions employed herein, said modifier substances being selected from the group consisting of (1) liquid substances having an atmospheric boiling point of at least about 150° C;

(2) solid substances having a surface area of less than about 0.8 $m^2$/gram and a particle size such that said substance will pass through a ¼ inch square opening, is substantially free of any absorbed or occluded water and will not decompose at a temperature below the maximum exotherm temperature generated by the urethane forming reaction;

(3) polymers of one or more ethylenically unsaturated monomers, said polymers having (a) a molecular weight such that the polymer has a grease melt flow index as determined with a 0.02-inch orifice employing a total weight of 2160 grams at 80° C of from about 1 to about 250 decigrams/minute, preferably from about 75 to about 200 decigrams/minute;

(b) a solubility parameter of at least about 8 and preferably from about 8 to about 12.5;

(c) and a specific heat of at least about 0.35 calories/gram/° C; and (4) mixtures thereof; and wherein components (A) and (B) are present in quantities such that the NCO:OH equivalent ratio is from about 0.75:1 to about 1.5:1 and with the following provisos:

(a) that the urethane exotherm temperature does not greatly exceed the boiling point of the monomer or mixture of monomers employed as component (C);

(b) that when component (A) is an amine initiated polyol, component (E) need not be present;

(c) that when component (B) is an aromatic polyisocyanate and component (C) contains a tertiary amino vinyl compound, the component (E) may be omitted;

(d) that the combined quantity of components (C) and (F) be less than about 60% by weight based upon the combined wieght of components (A), (B), (C) and (F);

(e) that when component (F-3) is employed as component (F), it is employed in quantities of ≦20% by weight of the combined quantities of components (A), (B) and (F);

(II) pouring the admixed composition into a suitable mold wherein said composition solidifies within about 15 minutes to a solid having the aforesaid density and elongation; and (III) subsequently demolding the resultant articles from the mold.

The present invention also pertains to non-cellular polyurethane/vinyl polymer composite articles having a density of at least about 1 g/cc, a percent elongation of less than about 100 and which can be demolded and used for its intended purpose, after cooling to a suitable handling temperature, within a period of about 15 minutes or less, without the application of an external source of heat, after admixture of a composition which comprises:

(A) a liquid polyol, or mixture of such polyols, preferably essentially free from ethylenic unsaturation, having from about 2 to about 8 hydroxyl groups and an OH equivalent weight of from about 30 to about 250; preferably from about 50 to about 200;

(B) an organic polyisocyanate, preferably essentially free from ethylenic unsaturation, having an NCO equivalent weight of less than about 300, preferably less than about 250, with the proviso that when component (A) has an average of about 2 hydroxyl groups per molecule, said polyisocyanate has an average of at least about 2.5 NCO groups per molecule;

(C) a liquid ethylenically unsaturated monomer preferably free from groups reactive with components (A) or (B), having an atmospheric boiling point above about 80° C, preferably above about 100° C and most preferably above about 120° C, or a mixture of such monomers;

(D) an effective quantity of a suitable catalyst for polymerizing component (C);

(E) an effective quantity of a suitable catalyst for urethane formation; and (F) from 0 to about 50% by weight based upon the combined weight of components (A), (B), (C), (D) (E) and (F) of a modifier substance free from groups reactive with components (A), (B) or (C) at the conditions employed herein, said modifier substances being selected from the group consisting of (1) liquid substances having an atmospheric boiling point of at least about 150° C;

(2) solid substances having a surface area of less than about 0.8 $m^2$/gram and a particle size such that said substance will pass through a ¼ inch square opening, is substantially free of any absorbed or occluded water and will not decompose at a temperature below the maximum exotherm temperature generated by the urethane forming reaction;

(3) polymers of one or more ethylenically unsaturated monomers, said polymers having (a) a molecular weight such that the polymer has a grease melt flow index as determined with a 0.02-inch orifice employing a total weight of 2160 grams at 80° C, from about 1 to about 250 decigrams/minute, preferably from about 75 to about 200 decigrams/minute;

(b) a solubility parameter of at least about 8 and preferably from about 8 to about 12.5;

(c) and a specific heat of at least about 0.35 calories/gram/° C; and (4) mixtures thereof; and wherein components (A) and (B) are present in quantities such that the NCO:OH equivalent ratio is from about 0.75:1 to about 1.5:1 and with the following provisos:

(a) that the urethane exotherm temperature does not greatly exceed the boiling point of the monomer employed as component (C);

(b) that when component (A) is an amine initiated polyol, component (C) need not be present;

(c) that when component (B) is an aromatic polyisocyanate and component (C) contains a tertiary amino vinyl compound, then component (E) may be omitted;

(d) that the combined quantity of components (C) and (F) be less than about 65% by weight based upon the combined weight of components (A), (B), (C) and (F);

(e) that when component (F-3) is employed as component (F), it is employed in quantities of about ≦20% by weight based upon the combined quantities of components (A), (B) and (F).

The present invention further pertains to a composition which when admixed with the appropriate catalysts rapidly produces, without the requirement of an external source of heat, a solid, rigid, composite of a polyurethane and a polymer of one or more ethylenically unsaturated monomers, said composition comprising (A) a liquid polyol, or mixture of such polyols, preferably essentially free from ethylenic unsaturation, having from 2 to about 8 hydroxyl groups and an OH equivalent weight of from about 30 to about 250, preferably from about 50 to about 200;

(B) an organic polyisocyanate, preferably essentially free from ethylenic unsaturation, having an NCO equivalent weight of less than about 300, preferably less than about 250, with the proviso that when component (A) has an average of about 2 hydroxyl groups per molecule, said polyisocyanate has an average of at least about 2.5 NCO groups per molecule; and (C) a liquid ethylenically unsaturated monomer, preferably free from groups reactive with components (A) or (B), having an atmospheric boiling point above about 80° C, preferably above about 100° C and most preferably above about 120° C, or a mixture of such monomers; wherein components (A) and (B) are present in quantities such that the NCO:OH equivalent ratio is from about 0.8:1 to about 1.5:1 and preferably from about 0.9:1 to about 1.2:1, with the proviso that the urethane exotherm temperature does not greatly exceed the boiling point of the monomer or mixture of monomers employed as component (C) with exotherm temperature results from admixture of the above composition with said catalyst.

The present invention still further pertains to rigid cellular polyurethane/vinyl polymer composite articles having substantially uniform cells, a substantially uniform density of less than 1 g/cc, preferably from about 0.025 to about 0.8 g/cc, and which can be demolded and used for its intended purpose, after cooling to a suitable handling temperature, within a period of about 15 minutes or less without the application of an external source of heat after admixture of a composition which comprises (A) a liquid polyol, or mixture of such polyols, preferably essentially free from ethylenic unsaturation, having from about 2 to about 8 hydroxyl groups and an OH equivalent weight of from about 30 to about 250, preferably from about 50 to about 200;

(B) an organic polyisocyanate, preferably essentially free from ethylenic unsaturation having an NCO equivalent weight of less than about 250, preferably less than about 200, with the proviso that when component (A) has an average of about 2 hydroxyl groups per molecule, said polyiscoyanate has an average of at least about 2.5 NCO groups per molecule;

(C) a liquid ethylenically unsaturated monomer, preferably free from groups reactive with components (A) or (B), having an atmospheric boiling point above about 80° C, preferably above about 100° C and most preferably above about 120° C, or a mixture of such monomers;

(D) an effective quantity of a suitable catalyst for polymerizing component (C);

(E) an effective quantity of a suitable catalyst for urethane formation; and (F) from 0 to about 50% by weight based upon the combined weight of components (A), (B), (C), (D), (E) and (F) of a modifier substance free from groups reactive with components (A), (B) or (C) at the conditions employed herein, said modifier substances being selected from the group consisting of (1) liquid substances having an atmospheric boiling point of at least about 150° C;

(2) solid substances having a surface area of less than about 0.8 $m^2$/gram and a particle size such that said substance will pass through a ¼ inch square opening is substantially free of any absorbed or occluded water and will not decompose at a temperature below the maximum exotherm temperature generated by the urethane forming reaction;

(3) polymers of one or more ethylenically unsaturated monomers, said polymers having (a) a molecular weight such that the polymer has a grease melt flow index as determined with a 0.02 inch orifice employing a total weight of 2160 grams at 80° C of from about 1 to about 250 decigrams/minute, preferably from about 75 to about 200 decigrams/minute;

(b) a solubility parameter of at least about 8 and preferably from about 8 to about 12.5;

(c) and a specific heat of at least about 0.35 calories/gram/° C; and (4) mixtures thereof;

(G) a foam-forming system which comprises (1) a foaming agent selected from the group consisting of (a) low boiling vaporizable organic liquids having a boiling point below the reaction exotherm temperature;

(b) substances which decompose thermally to release $CO_2$ or release water vapor at the exotherm temperature;

(c) a solid particulate substance which will pass through a 2 mm, preferably 1 mm square opening and which has a surface area of at least 0.8 $m^2$/gram, preferably at least about 1 $m^2$/gram;

(d) an inorganic metal hydrate characterized as having a solubility in anhydrous ethyl alcohol of less than about 1.2 grams per 100 grams and a weight loss of at least 5%; preferably at least about 8% when subjected to a temperature of 115° C for 30 minutes at atmospheric pressure;

(e) water;

(f) mixtures thereof; and (2) a cell control agent; and wherein components (A) and (B) are present in quantities such that the NCO:OH equivalent ratio is from about 0.8:1 to about 1.5:1, component (G-1) is present in quantities sufficient to provide the desired density and component (G-2) is present in quantities sufficient to provide substantially uniform cells; and with the following provisos:

(a) that the urethane exotherm temperature does not greatly exceed the boiling point of the monomer or mixture of monomers employed as component (C);

(b) that when component (A) is an amine initiated polyol, component (E) need not be present;

(c) that when component (B) is an aromatic polyisocyanate and component (C) contains a tertiary amino vinyl compound, the component (E) may be omitted;

(d) that the combined quantity of components (C) and (F) be less than about 60% by weight based upon the combined weight of components (A), (B), (C) and (F);

(e) that when component (G-1-c) or (G-1-d) is employed as the blowing agent, component (G-2) is not required;

(f) that when component (F-3) is employed as component (F) it is employed in quantities of from about ≦20% by weight based upon the combined weight of components (A), (B) and (F).

The present invention still further pertains to a process for preparing rigid cellular polyurethane/vinyl polymer composite articles having substantially uniform cells, a substantially uniform density of less than 1 g/cc, preferably from about 0.025 to about 0.8 g/cc, and which can be demolded and used for its intended purpose, after cooling to a suitable handling temperature, within a period of about 15 minutes or less, without the application of an external source of heat after admixture of a composition which comprises:

(I) admixing the components of a composition comprising (A) a liquid polyol, or mixture of such polyols, preferably essentially free from ethylenic unsaturation, having from about 2 to about 8 hydroxyl groups and an OH equivalent weight of from about 30 to about 250, preferably from about 50 to about 200;

(B) an organic polyisocyanate, preferably essentially free from ethylenic unsaturation, having an NCO equivalent weight of less than about 250, preferably less than about 200, with the proviso that when component (A) has an average of about 2 hydroxyl groups per molecule, said polyisocyanate has an average of at least about 2.5 NCO groups per molecule;

(C) a liquid ethylenically unsaturated monomer, preferably free from groups reactive with components (A) or (B) having at atmospheric boiling point above about 80° C, preferably above about 100° C and most preferably above about 120° C, or a mixture of such monomers;

(D) an effective quantity of a suitable catalyst for polymerizing component (C);

(E) an effective quantity of a suitable catalyst for urethane formation; and (F) from 0 to about 50% by weight based upon the combined weight of components (A), (B), (C), (D), (E) and (F) of a modifier substance free from groups reactive with components (A), (B) or (C) at the conditions employed herein, said modifier substances being selected from the group consisting of (1) liquid substances having an atmospheric boiling point of at least about 150° C;

(2) solid substances having a surface area of less than about 0.8 $m^2$/gram and a particle size such that said substance will pass through a ¼ inch square opening is substantially free of any absorbed or occluded water and will not decompose at a temperature below the maximum exotherm temperature generated by the urethane forming reaction;

(3) polymers of one or more ethylenically unsaturated monomers, said polymers having (a) a molecular weight such that the polymer has a grease melt flow index as determined with a 0.02 inch orifice employing a total weight of 2160 grams at 80° C of from about 1 to about 250 decigrams/minute, preferably from about 75 to about 200 decigrams/minute;

(b) a solubility parameter of at least about 8 and preferably from about 8 to about 12.5;

(c) and a specific heat of at least about 0.35 calories/gram/° C; and (4) mixtures thereof;

(G) a foam-forming system which comprises (1) a foaming agent selected from the group consisting of (a) low boiling vaporizable organic liquids having a boiling point below the reaction exotherm temperature;

(b) substances which decompose thermally to release $CO_2$ or release water vapor at the exotherm temperature;

(c) a solid particulate substance which will pass through a 2 mm, preferably 1 mm square opening and which has a surface area of at least 0.8 $m^2$/gram, preferably at least about 1 $m^2$/gram;

(d) an inorganic metal hydrate characterized as having a solubility in anhydrous ethyl alcohol of less than about 1.2 grams per 100 grams and a weight loss of at least 5%; preferably at least about 8% when subjected to a temperature of 115° C for 30 minutes at atmospheric pressure;

(e) water;

(f) mixtures thereof; and (2) a cell control agent; and wherein components (A) and (B) are present in quantities such that the NCO:OH equivalent ratio is from about 0.75:1 to about 1.5:1, component (G-1) is present in quantities sufficient to provide the desired density and component (G-2) is present in quantities sufficient to provide substantially uniform cells; and with the following provisos:

(a) that the urethane exotherm temperature does not greatly exceed the boiling point of the monomer or mixture of monomers employed as component (C);

(b) that when component (A) is an amine initiated polyol, component (E) need not be present;

(c) that when component (B) is an aromatic polyisocyanate and component (C) contains a tertiary amino vinyl compound, then component (E) may be omitted;

(d) that the combined quantity of components (C) and (F) be less than about 60% by weight based upon the combined weight of components (A), (B), (C) and (F);

(e) that when component (G-1-c) or (G-1-d) is employed as the blowing agent, component (G-2) is not required;

(f) that when component (F-3) is employed as the modifier component, it is employed in quantities of ≦20% by weight of the combined weight of components (A), (B), and (F);

(II) pouring the admixed composition into a suitable mold wherein said composition solidifies within the 15 minutes to a solid having the aforesaid density; and (III) subsequently demolding the resultant article from the mold.

Suitable polyols which may be suitably employed as component (A) include those prepared by reacting an initiator having from 2 to about 8 active hydrogens with a vicinal epoxy compound.

Suitable initiator compounds include water, ethylene glycol, propylene glycol, glycerine, trimethylolpropane, pentaerythritol, sorbitol, sucrose, hydroquinone, resorcinol, catechol, bisphenols, novolac resins, ammonia, ethylenediamine, propylenediamine, 1,6-hexanediamine, diethylenetriamine, triethylenetetramine, tetraethylenepentamine, aminoethylethanolamine, mixtures thereof and the like.

Suitable vicinal epoxy compounds include, for example, ethylene oxide, 1,2-propylene oxide, 1,2-butylene oxide, 2,3-butylene oxide, epichlorohydrin, epibromohydrin, styrene oxide, butylglycidylether, phenylgycidylether, mixtures thereof and the like.

Suitable polyisocyanates which may be employed as component (B) in the present invention include, for example, any organic polyisocyanate having 2 or more NCO groups per molecule and no other substituents capable of reacting with the polyol. Suitable such polyiscoyanates include aromatic, aliphatic and cycloaliphatic polyisocyanates such as, for example, 2,4-toluenediisocyanate, 2,6-toluenediisocyanate, hexamethylene diisocyanate, p,p'-diphenylmethanediisocyanate, p-phenylenediisocyanate, hydrogenated methylene diphenyl diisocyanate (e.g. Hylene ® W), naphthalene diisocyanate, dianisidine diisocyanate, polymethylene polyphenylisocyanate, mixtures of one or more polyisocyanates and the like.

Other organic isocyanates which may suitably be employed and which are to be included in the term "organic polyisocyanate" include isocyanate terminated prepolymers prepared from the previously mentioned polyols and the above mentioned isocyanates. These isocyanate terminated prepolymers should contain at least about 15 weight % isocyanate groups. If the weight fraction of the isocyanate groups in the prepolymer is about 12 wt. % or less, the catalyzed reaction between the low equivalent weight polyol and the isocyanate prepolymer will not yield a sufficiently high exotherm to allow the catalyzed vinyl polymerization to take place. The resulting product in this situation (e.g. use of a prepolymer containing about 12 wt. % or less NCO which results in an insufficiently polymerized vinyl fraction) is a gelled urethane polymer having undesirably low physical properties. It is possible to cure these products by subsequent prolonged baking at elevated temperatures (i.e. about 100° C for several hours). However, our described process demonstrates a method of successfully rapidly polymerizing both the urethane forming reactants and vinyl component essentially simultaneously to yield high strength castings and avoids the necessity of further thermal treatment.

Solid polyisocyanates are more conveniently employed by dissolving them in one of the components being employed, for example, methylene diphenyl diisocyanate can be dissolved in styrene, or bitolylene diisocyanate may be dissolved in tolylene diisocyanate.

The liquid, polymerizable ethylenically unsaturated monomer, component (C), must of necessity have a boiling point (atmospheric) above about 80° C, preferably at least about 100° C and most preferably above about 120° C. The reason for this is that the exotherm generated by the urethane reaction must exhibit a temperature of at least about 80° C for the monomer component to polymerize substantially simultaneously along with the urethane components. Thus, a vinyl compound boiling at about 80° C will tend to boil off and/or result in an undesirable bubble filled solid having a loss in monomer and reduce concentration of vinyl polymer in the resulting composite usually accompanied by a loss of physical properties. An example of an inoperable monomer is vinyl acetate having an atmospheric boiling point of about 73° C. Naturally, a vinyl compound having a very high boiling point, say above about 160° C would be preferred in formulations employing low equivalent weight polyols and polyisocyanates. Monomers that boil between about 95° C and 160° C generally require that either a high equivalent weight polyol (about 140 to about 250) or that a high equivalent weight polyisocyanate (at least about 125) or that a modifier, component (F), be employed or that the catalyst for urethane formation be a tertiary amine. In effect the urethane exotherm temperature must not greatly exceed the boiling point of the vinyl component.

Suitable monomers which can be employed as component (C) include, for example, styrene, divinylbenzene, 2-ethylhexylacrylate, butylacrylate, tertiarybutyl styrene, trimethylolpropane trimethacrylate, 1,3-butylene glycol dimethacrylate, vinyl toluene, chlorostyrene, methyl methacrylate and vinyl benzylchloride.

Other suitable monomers include butyl methacrylate, indene, vinyl naphthalene (m.p.=60°-62° C), vinyl cyclohexane, vinyl benzoate and vinyl sulfone. Note that all of the vinyl compounds mentioned have an atmospheric boiling point above about 80° C. Inoperable monomers include vinyl ether, vinyl ethyl ether, vinylidene chloride, acrylonitrile, and vinyl acetate.

Suitable polymerizable ethylenically unsaturated monomers which contain a tertiary amino group include, for example, tertiarybutylaminoethyl methacrylate, N,N'-diethylaminoethyl acrylate, N,N-diethylaminoethyl methacrylate, N,N-dimethylaminoethyl methacrylate, N-vinylpyrrolidone, 2-N-morpholinoethyl acrylate, mixtures thereof and the like.

When the polymerizable, ethylenically unsaturated amine-containing monomers are employed in concentrations of at least about 10 percent by weight based upon the combined weight of the components for urethane formation (components (A) and (B)), then no urethane catalyst is required, although such can be included if desired.

The monomer concentration in the formulation can range from at least about 15 wt. % to less than about 65 wt. %, preferably from about 20% to about 50% by weight based on the combined weight based on the combined weight of components (A), (B), (C), (D) and (E). No substantial contribution of the monomer can be observed in formulations containing substantially less than about 15 wt. % of that vinyl compound. On the other hand as the monomer component is increased beyond about 60 wt. %, the urethane exotherm diluted by the heat sink effect of the monomer mass prevents the temperature of the formulation from reaching the necessary temperature of about 80° C for substantially simultaneous monomer polymerization and polyurethane formation to take place. As a consequence, the common result is that there is a separation of the liquid vinyl monomer from the solid urethane polymer thus formed.

Generally, liquid (at room temperature) monomers are preferred, but solid (at room temperature) monomers can also be used if they are dissolved in another monomer or polyol or liquid modifier substance or polyisocyanate to yield a fluid mixture. As an example, vinyl naphthalene can be dissolved in styrene monomer.

The present invention requires the use of two types of catalysts, namely a catalyst for urethane formation and a catalyst for the polymerization of ethylenically unsaturated monomers. An exception is when Component (A) contains an amine initiated polyol or when the polymerizable monomer contains a tertiary amine group in which instances a catalyst for urethane formation is not required, but such can be employed, if desired.

Suitable catalysts for urethane formation include, for example, organo metal compounds, tertiary aliphatic amines, and alkali metal alkoxides.

Suitable organo-metal catalysts for urethane formation include, for example, organo-metal compounds of tin, zinc, lead, mercury, cadmium, bismuth, antimony, iron, manganese, and the like such as, for example, metal salts of a carboxylic acid having from about 2 to about 20 carbon atoms including, for example, stannous octoate, dibutyltin dilaurate, dibutyltin diacetate, ferric acetyl acetonate, lead octoate, lead oleate, phenylmercuric propionate, lead naphthenate, manganese naphthenate, zinc octoate, antimony octoate, mixtures thereof and the like.

Suitable amine catalysts for urethane formation include, for example, triethylenediamine, triethylamine, tetramethylbutanediamine, N,N-dimethylethanolamine, N-ethyl morpholine, bis(2-dimethylaminoethyl)ether, N-methylmorpholine, N-ethylpiperidine, 1,3-bis(dimethylamino)-2-propanol, N,N,N',N'-tetramethyl ethylenediamine, mixtures thereof and the like.

Suitable alkali metal alkoxides which can be employed as catalysts for urethane formation include, for example, sodium ethoxide, potassium ethoxide, sodium propoxide, potassium propoxide, sodium butoxide, potassium butoxide, lithium ethoxide, lithium propoxide, lithium butoxide, alkali metal salts of polyols such as described in U.S. Pat. No. 3,728,308, mixtures thereof and the like.

Preferably, these urethane catalysts are in liquid form, but if they are inherently a solid at room temperature then they may be dissolved in an appropriate liquid having a boiling point above about 150° C, such as, for example, dipropylene glycol.

The effective quantity of the organo-metal and alkali metal alkoxide urethane catalyst is usually at least about 0.005 weight % and can be as high as about 5 wt. % and above (based on the combined weight of components (A), (B), (C), (D) and (E)). Preferably the range of these urethane catalyst is from about 0.1 to about 1 wt. %.

When the aliphatic tertiary amine catalysts are employed alone, they usually require from about 2 to 20 times the usual quantity of organometal catalysts i.e., usually from about 1% to about 15% and preferably from about 2% to about 10% based upon the combined quantity of components (A), (B), (C), (D) and (E).

The choice of a particular catalyst and the concentration of this catalyst can depend on the chosen polyol, polyisocyanate and vinyl monomer. In any event, the criticality of the catalyst concentration is that it must cause the blend of polyol, polyisocyanate and vinyl compound to exotherm to at least a temperature above about 80° C with the reactants initially at room temperature. Naturally, the catalyst requirement may be reduced in concentration if the reactants are warmed above room temperature.

Suitable catalysts for polymerization of the ethylenically unsaturated monomers include "free radical" type catalysts or "initiators" such as, for example, tertiarybutyl perbenzoate, tertiarybutyl peracetate, 2,5-dimethyl hexane diperoxy-2-ethyl hexoate, bis(4-tertiarybutyl cyclohexyl)peroxydicarbonate, tertiarybutylperoxy isopropyl carbonate, azobisisobutyronitrile and 2,2'-azobis(2,4-dimethylvaleronitrile).

Other suitable vinyl catalysts include, for example, benzoyl peroxide, methyl ethyl ketone peroxide, cumene hydroperoxide or tert. butyl peroxypivalate, but generally those in the first mentioned group may be preferred since they can yield composite resin castings that usually yield higher hardness or stiffness or yield a more desirable color in the cast resin.

The effective quantity of vinyl catalyst (or initiator) is usually from at least about 0.05 wt. % to about 5 wt. % (based on the combined weight of components (A), (B), (C), (D) and (E)). Preferably, the vinyl catalyst concentration is from about 0.1 wt. % to about 1 wt. %.

The critical requirement, if there be one, for the vinyl catalyst concentration is that sufficient catalyst be present to prevent a vinyl monomer plasticized urethane resin as the resulting product rather than the desired composite of a vinyl polymer and a urethane polymer.

When a non-adducted aromatic polyisocyanate is employed (as component (B)), component (C) has an atmospheric boiling point between about 80° C and 160° C, the combined equivalent weight of components (A) and (B) is less than about 250 and an organometal catalyst is employed as the catalyst for urethane formation, component (E), then the modifier component (F) is usually present in quantities of from at least 10% and preferably from about 15% to about 35% by weight based upon the combined weight of components (A) through (F) so as to prevent an uncontrolled swelling, fissure development and/or distortion in the resultant product. In those instances where a modifier substance is not necessary, they can sometimes be employed to modify the chemical and/or physical properties of the resultant products.

Suitable modifier substances which may be employed as component (F) include those described in U.S. Pat. No. 3,773,697 and so much thereof as pertains to suitable modifier substances are incorporated herein by reference.

Also included herein as suitable solid modifiers are the woven or mat materials wherein the individual fibers from which such materials are prepared have a surface area of less than 0.8 $m^2$/gram and which will pass through a ¼-inch square opening.

Suitable low boiling liquids which can be employed herein as component (G-1-a) include for example methylene chloride, trichloromonofluoromethane, 1,2-dibromotetrafluoroethane, 1,1,1-trichlorotrifluoroethane, acetone, 1,1,1-trichloroethane, mixtures thereof and the like.

Suitable substances which decompose thermally to release $CO_2$ or water vapor at the reaction temperature which can be employed herein as component (G-1-b) include, for example, $MgSO_4.7H_2O$, $Na_2CO_3.10H_2O$, $Na_3PO_4.12H_2O$, $Ca(NO_2)_2.4H_2O$, $(NH_4)_2CO_3.H_2O$, $NH_4HCO_3$, mixtures thereof and the like.

Suitable solid particulate substances which can be employed herein as component (G-1-c) include for example, those described in U.S. Pat. No. 3,753,933, incorporated herein by reference.

Suitable inorganic metal hydrates which can be employed herein as component (G-1-d) include, for example, those described in U.S. Pat. No. 3,751,392, incorporated herein by reference.

Suitable cell control agents which can be employed herein as component (G-2) include silicone oils such as, for example, DC-193, DC-195, DC-197 and DC-198 commercially available from Dow Corning Corp.; SF-1034, PFA-1635, PFA-1700 and PFA-1660 commercially available from General Electric Co.; and L-520 and L-5320 commercially available from Union Carbide Corp.; and the like.

The shaping or forming of these polymer-forming and urethane-forming ingredients into non-elastomeric composite articles may be accomplished by pouring the reactive mixture into molds made of substances such as, for example, polyethylene, polypropylene or polyethylene terephthalate such as Mylar ®, silicone elastomers, or metals such as aluminum, copper or alloys such as brass or stainless steel. The critical requirements of the mold are that it can withstand the exotherm of the polymerizing mass and be non-reactive or insoluble in contact with the liquid charge. To prevent the solidifying mass from adhering to the mold surface, it may be necessary to precoat the mold surface with a film of a hydrocarbon wax or a polysiloxane preparation or a polytetrafluoroethylene coating, or employ an internal mold release agent in the composition.

Since it is critical that the reacting mass which is poured into the mold reach a minimum temperature, i.e., about 80° C, as a result of the exotherm initiated by the previously mentioned urethane catalyst, it is preferred that the molds exhibit the property of low thermal conductivity and/or possess low thermal capacity compared to the mass of the fluid poured into the molds. Therefore, it is preferable that the mold possess relatively thin walls, especially those made of metals having a high thermal conductivity.

In those instances where heavy, thick wall high thermal conductivity metal molds are to be used, the "heat sink" effect that would prevent a formulation from reaching and exceeding the minimum temperature of about 80° C can be overcome by preheating the mold to temperatures above ambient up to about 75° C.

Generally, the thickness of castings obtainable by the process of the present invention can be dependent on these factors:

(A) boiling point of the vinyl monomer
(B) equivalent weight of the polyol and polyisocyanate components
(C) catalyst concentration Low boiling vinyl compounds (say 100° C to 150° C) are useful for castings having a thickness of from about ⅛-inch to about ½-inch. Swelling or cracking of the casting may be experienced when using low boiling vinyl compounds for casting thicknesses from about one inch to several inches. Higher boiling vinyl compounds (say 150° C to 250° C or above) are preferred for casting these thick products.

The following Examples are illustrative of the present invention, but are not to be construed as being limited thereto.

In the following Examples and Comparative Experiments, unless otherwise noted, all of the components (except the catalyst for urethane formation or when no catalyst for urethane formation was employed, the polyisocyanate) were thoroughly blended together after which said catalyst or polyisocyanate was added and admixed therewith.

The following polyols and polyisocyanates were employed in the examples.

POLYOL A was an adduct of glycerine and propylene oxide, said adduct having an active hydrogen (OH) equivalent weight of about 87.

POLYOL B was an adduct of sucrose and propylene oxide, said adduct having an active hydrogen (OH) equivalent weight of about 161.

POLYOL C was an adduct of aminoethylethanolamine and propylene oxide, said adduct having an active hydrogen (OH) equivalent weight of about 70.

POLYOL D was dipropylene glycol (eq. wt. = about 67).

POLYOL E was an adduct of glycerine and propylene oxide, said adduct having an active hydrogen (OH) equivalent weight of about 500.

POLYOL F was an adduct of glycerine and proplyene oxide, said adduct having an active hydrogen (OH) equivalent weight of about 1000.

POLYOL G was an adduct of glycerine and propylene oxide, said adduct having an active hydrogen (OH) equivalent weight of about 150.

POLYOL H was an adduct of aminoethylethanolamine and propylene oxide, said adduct having an active hydrogen (OH) equivalent weight of about 81.

POLYOL I was an adduct of glycerine and ethylene oxide, said adduct having an active hydrogen (OH) equivalent weight of about 76.

POLYOL J was polyoxyethylene glycol having an OH equivalent weight of about 150.

POLYOL K was polyoxyethylene glycol having an OH equivalent weight of about 100.

POLYOL L was a polyester diol prepared from an aromatic dibasic acid and a long chain glycol having an OH equivalent weight of about 197 commercially available from the Ruco Div. of Hooker Chemical Co. as Rucoflex R-109-270.

POLYOL M was bis(2-hydroxypropyl)isophthalate having an OH equivalent weight of about 140.

POLYOL N was a 2.5 functional hydroxyl terminated moderately branched polyester having an OH equivalent weight of about 967 commercially available from the Ruco Div. of Hooker Chemical Co. as Rucoflex F-109.

POLYISOCYANATE A was an 80/20 mixture by weight of 2,4-/2,6-toluenediisocyanate having an NCO equivalent weight of about 87.

POLYISOCYANATE B was an adduct (quasi-prepolymer) of Polyol A and Polyisocyanate A, said adduct containing about 30% to 32% by weight free NCO groups and having an NCO equivalent weight of about 131.

POLYISOCYANATE C was a polymethylene polyphenylisocyanate having an average functionality of about 2.6–2.8 and an NCO equivalent weight of about 134.

POLYISOCYANATE D was an adduct (quasi-prepolymer) of Polyisocyanate A and a polyoxyethyleneglycol having an average molecular weight of about 400, said adduct having about 21.6% by weight free NCO groups and an NCO equivalent weight of about 194.

POLYISOCYANATE E was an adduct (quasi-prepolymer) of Polyisocyanate A and a polyoxyethyleneglycol having an average molecular weight of about 400, said adduct having about 12% by weight free NCO groups and an NCO equivalent weight of about 340.

POLYISOCYANATE F was xylylene diisocyanate having an NCO equivalent weight of about 94.

POLYISOCYANATE G was diphenylmethane diisocyanate having an NCO equivalent weight of about 125.

POLYISOCYANATE H was bitolylene diisocyanate having an NCO equivalent weight of about 136.

POLYISOCYANATE I was hydrogenated methylenediphenyl diisocyanate having an NCO equivalent weight of about 132.

EXAMPLE 1

The following components were thoroughly blended:

Component (A) — 50 grams of Polyol A
Component (B) — 75 grams of Polyisocyanate B
Component (C) — 50 grams of styrene having an atmospheric boiling point of about 145.2° C
Component (D) — 1 cc (1 gram) of tertiarybutyl perbenzoate (density = about 1 g/cc)
Component (E) — 1 cc (1.14 grams) lead octoate (24% by wt. lead) (density = about 1.14 g/cc)

The NCO:OH equivalent ratio was about 1:1.

The quantity of Component (C) was about 28.23% by weight based upon the combined weight of Components (A), (B), (C), (D) and (E).

The quantity of Component (D) was about 0.56% by weight based upon the combined quantity of Components (A), (B), (C), (D) and (E).

The quantity of Component (E) was about 0.65% by weight based upon the combined quantity of Components (A), (B), (C), (D) and (E).

The resultant mixture was poured into a Mylar® tray and was observed to suddenly solidify within about 25 seconds and was demolded within about 60 seconds after catalyst addition. The resultant solid, transparent, essentially bubble-free casting had the following properties:

| | |
|---|---|
| Density | >1 gram/cc |
| Ultimate tensile strength | 15,818 psi (1112.16 kg/cm²) |
| Elongation | 11% |

COMPARATIVE EXPERIMENT A (no vinyl polymerization catalyst which results in products with poor physical properties)

The following components were thoroughly blended:

Component (A) — 50 grams of Polyol A
Component (B) — 75 grams of Polyisocyanate B
Component (C) — 50 grams of styrene having an atmospheric boiling point of about 145.2° C
Component (D) — not present
Component (E) — 1 cc (1.14 grams) of lead octoate (24% by wt. lead) (density = about 1.14).

The NCO:OH equivalent ratio was about 1:1.

The quantity of Component (C) was about 28.39% by weight based upon the combined weight of Components (A), (B), (C), (D) and (E).

The quantity of Component (E) was about 0.65% by weight based upon the combined quantity of Components (A), (B), (C), (D) and (E).

The resultant mixture was poured into a Mylar ® tray and was observed to suddenly solidify within about 20 seconds after catalyst addition. The resultant casting had the following properties:

| | |
|---|---|
| Density | >1 grams/cc |
| Ultimate tensile strength | 972 psi (68.34 kg/cm$^2$) |
| Elongation | 51% |

The casting had a strong odor of monomeric styrene.

EXAMPLE 2

The following components were thoroughly blended:

Component (A) — 50 grams of Polyol A

Component (B) — 75 grams of Polyisocyanate B

Component (C) — 50 grams of styrene having an atmospheric boiling point of about 145.2° C Component (D) — 0.8 cc (0.8 gram) tertiarybutylperoxy isopropyl carbonate (density = about 1 g/cc)

Component (E) — 0.8 cc (0.91 gram) of lead octoate (24% by wt. lead) (density = about 1.14 g/cc)

The NCO:OH equivalent ratio was about 1:1.

The quantity of Component (C) was about 28.29% by weight based upon the combined weight of Components (A), (B), (C), (D) and (E).

The quantity of Component (D) was about 0.45% by weight based upon the combined quantity of Components (A), (B), (C), (D) and (E).

The quantity of Component (E) was about 0.51% by weight based upon the combined quantity of Components (A), (B), (C), (D) and (E).

The resultant mixture was poured into a Mylar ® tray and was observed to suddenly solidify within about 25 seconds and was demolded within about 60 seconds after catalyst addition. The resultant solid, transparent, essentially bubble-free casting had the following properties:

| | |
|---|---|
| Density | >1 gram/cc |
| Ultimate tensile strength | 15,819 psi (1112.23 kg/cm$^2$) |
| Elongation | 12% |

EXAMPLE 3

The following components were thoroughly blended:

Component (A) 50 grams of Polyol A.

Component (B) — 75 grams of Polyisocyanate B.

Component (C) — 50 grams of styrene having an atmospheric boiling point of about 145.2° C.

Component (D) — 1 cc (0.9 gram) of tertiarybutyl hydroperoxide (density = about 0.9 g/cc)

Component (E) — 0.5 cc (0.57 gram) of lead octoate (24% by wt. lead) (density = about 1.14 g/cc)

The NCO:OH equivalent ratio was about 1:1.

The quantity of Component (C) was about 28.43% by weight based upon the combined weight of Components (A), (B), (C), (D) and (E).

The quantity of Component (D) was about 0.51% by weight based upon the combined quantity of Components (A), (B), (C), (D) and (E).

The quantity of Component (E) was about 0.32% by weight based upon the combined quantity of Components (A), (B), (C), (D) and (E).

The resultant mixture was poured into a Mylar ® tray and was observed to suddenly solidify within about 25 seconds and was demolded within about 2 minutes after catalyst/polyisocyanate addition. The resultant solid, essentially bubble-free casting had the following properties:

| | |
|---|---|
| Density | >1 gram/cc |
| Ultimate tensile strength | 13,269 psi (932.94 kg/cm$^2$) |
| Elongation | 10% |

EXAMPLE 4

The following components were thoroughly blended:

Component (A) — 50 grams of Polyol A.

Component (B) — 50 grams of Polyisocyanate A.

Component (C) — 50 grams of tertiarybutyl styrene having an atmospheric boiling point of 219° C.

Component (D) — 1 cc (1 gram) of tertiarybutylperoxy isopropyl carbonate (density = about 1 g/cc).

Component (E) — 1 cc (1.14 grams) of lead octoate (24% by wt. lead) (density = about 1.14)

The NCO:OH equivalent ratio was about 1:1.

The quantity of Component (C) was about 32.86% by weight based upon the combined weight of Components (A), (B), (C), (D) and (E).

The quantity of Component (D) was about 0.66% by weight based upon the combined quantity of Components (A), (B), (C), (D) and (E).

The quantity of Component (E) was about 0.75% by weight based upon the combined quantity of Components (A), (B), (C), (D) and (E).

The resultant mixture was poured into a Mylar ® tray and was observed to suddenly solidify within about 30 seconds and was demolded within about 3 minutes after catalyst addition. The resultant solid, essentially bubble-free casting had the following properties:

| | |
|---|---|
| Density | >1 grams/cc |
| Ultimate tensile strength | 8909 psi (626.39 kg/cm$^2$) |
| Elongation | 9% |
| Hardness | 35 Barcol (No. 934-1 tester) |

EXAMPLE 5

The following components were thoroughly blended:

Component (A) — 50 grams of Polyol A.

Component (B) — 50 grams of Polyisocyanate A.

Component (C) — 26 grams of divinylbenzene having an atmospheric boiling point of about 199.5° C. 24 grams of ethylvinyl benzene having an atmospheric boiling point of about 178° C.

Component (D) — 1 cc (1 gram) of tertiarybutylperoxy isopropyl carbonate (density = about 1 g/cc)

Component (E) — 1 cc (1.14 grams) of lead octoate (24% by wt. lead) (density = about 1.14 g/cc)

The NCO:OH equivalent ratio was about 1:1.

The quantity of Component (C) was about 32.86% by weight based upon the combined weight of Components (A), (B), (C), (D) and (E).

The quantity of Component (D) was about 0.66% by weight based upon the combined quantity of Components (A), (B), (C), (D) and (E).

The quantity of Component (E) was about 0.75% by weight based upon the combined quantity of Components (A), (B), (C), (D) and (E).

The resultant mixture was poured into a Mylar® tray and was observed to suddenly solidify within about 20 seconds and was demolded within about 2 minutes after catalyst addition. The resultant solid, essentially bubble-free casting had the following properties:

| | |
|---|---|
| Density | >1 gram/cc |
| Ultimate tensile strength | 4923 psi (346.14 kg/cm$^2$) |
| Elongation | 4% |
| Hardness | >50 Barcol (No. 934-1 tester) |

EXAMPLE 6

The following components were thoroughly blended:
Component (A) — 100 grams of Polyol B.
Component (B) — 50 grams of Polyisocyanate A.
Component (C) — 50 grams of styrene having an atmospheric boiling point of about 145.2° C.
Component (D) — 1 cc (1 gram) of tertiarybutyl perbenzoate (density = about 1 g/cc)
Component (E) — 0.5 cc (0.57 gram) of lead octoate (24% by wt. lead) (density = about 1.14 g/cc)
The NCO:OH equivalent ratio was about 0.92:1.

The quantity of Component (C) was about 24.81% by weight based upon the combined weight of Components (A), (B), (C), (D) and (E).

The quantity of Component (D) was about 0.5% by weight based upon the combined quantity of Components (A), (B), (C), (D) and (E).

The quantity of Component (E) was about 0.28% by weight based upon the combined quantity of Components (A), (B), (C), (D) and (E).

The resultant mixture was poured into a Mylar® tray and was observed to suddenly solidify within about 10 seconds and was demolded within about 2 minutes after catalyst addition. The resultant solid, essentially bubble-free casting had the following properties:

| | |
|---|---|
| Density | >1 gram/cc |
| Ultimate tensile strength | 10,781 psi (758.01 kg/cm$^2$) |
| Elongation | 13% |
| Hardness | 40-45 Barcol (No.934-1 tester) |

COMPARATIVE EXPERIMENT B: (No vinyl polymerization catalyst present which results in product of poor physical properties)
Component (A) — 100 grams of Polyol B.
Component (B) — 50 grams of Polyisocyanate A.
Component (C) — 50 grams of styrene having an atmospheric boiling point of about 145.2° C.
Component (D) — not present.
Component (E) — 0.5 cc (0.57 gram) lead octoate (24% by wt. lead) (density = about 1.14 g/cc)
The NCO:OH equivalent ratio was about 0.92:1.

The quantity of Component (C) was about 24.93% by weight based upon the combined weight of Components (A), (B), (C), (D) and (E).

The quantity of Component (E) was about 0.28% by weight based upon the combined quantity of Components (A), (B), (C), (D) and (E).

The resultant mixture was poured into a Mylar® tray and was observed to suddenly solidify within about 10 seconds and was demolded within about 4 minutes after catalyst addition. The resultant solid, essentially bubble-free casting had the following properties:

| | |
|---|---|
| Density | >1 gram/cc |
| Ultimate tensile strength | 2800 psi (196.87 kg/cm$^2$) |
| Elongation | 16% |
| Hardness | <2 Barcol (No. 934-1 tester) |

This casting was observed to have hairline fractures on the surface and was noticeably more flexible and softer than the casting of Example 6.

EXAMPLE 7

The following components were thoroughly blended:
Component (A) — 45 grams of polyol H.
component (B) — 50 grams of Polyisocyanate A.
Component (C) — 50 grams of tertiarybutyl styrene having an atmospheric boiling point of about 219° C.
Component (D) — 1 cc (1 gram) tertiarybutyl perbenzoate (density = about 1 g/cc).
Component (E) — not present.
The NCO:OH equivalent ratio was about 1.02:1.

The quantity of Component (C) was about 34.25% by weight based upon the combined weight of Components (A), (B), (C), (D) and (E).

The quantity of Component (D) was about 0.68% by weight based upon the combined quantity of Components (A), (B), (C), (D) and (E).

The resultant mixture was poured into a Mylar® tray and was observed to suddenly solidify within about 30 seconds and was demolded within about 3 minutes after polyisocyanate addition. The resultant solid, essentially bubble-free casting had the following properties:

| | |
|---|---|
| Density | >gram/cc |
| Ultimate tensile strength | 9024 psi (634.48 kg/cm$^2$) |
| Elongation | 8% |
| Hardness | 50 Barcol (No. 934-1 tester) |

EXAMPLE 8

The following components were thoroughly blended:
Component (A) — 40 grams of Polyol A.
Component (B) — 40 grams of Polyisocyanate A.
Component (C) — 40 grams of the trimethacrylate ester of trimethlolpropane having a boiling point of about 185° C at 5 mm Hg.
Component (D) — 0.4 cc (0.4 gram) tertiarybutyl perbenzoate (density = about 1 g/cc).
Component (E) — 1 cc (1.14 gram) of lead octoate (24% by wt. lead) (density = 1.14 g/cc).
The NCO:OH equivalent ratio was about 1:1.

The quantity of Component (C) was about 24.76% by weight based upon the combined weight of Components (A), (B), (C), (D) and (E).

The quantity of Component (D) was about 0.25% by weight based upon the combined quantity of Components (A), (B), (C), (D) and (E).

The quantity of Component (E) was about 0.71% by weight based upon the combined quantity of Components (A), (B), (C), (D) and (E).

The resultant mixture was poured into a Mylar® tray and was observed to suddenly solidify within about 40 seconds and was demolded within about 2 minutes after catalyst addition. The resultant solid, rigid, essentially bubble-free casting had the following properties:

| Density | >1 grams/cc |
|---|---|
| Hardness | 60 Barcol (No. 934-1 tester) |

EXAMPLE 9

The following components were thoroughly blended:

Component (A) — 40 grams of Polyol A.

Component (B) — 40 grams of Polyisocyanate A.

Component (C) — 40 grams of the dimethacrylate ester of 1,3-butylene glycol having a boiling point of about 110° C at 3 mm Hg.

Component (D) — 0.4 cc (0.4 gram) of tertiarybutyl perbenzoate (density = about 1 g/cc).

Component (E) — 1 cc (1.14 gram) of lead octoate (24% by weight lead) (density = about 1.14 g/cc).

The NCO:OH equivalent ratio was about 1:1.

The quantity of Component (C) was about 24.76% by weight based upon the combined weight of Components (A), (B), (C), (D) and (E).

The quantity of Component (D) was about 0.25% by weight based upon the combined quantity of Components (A), (B), (C), (D) and (E).

The quantity of Component (E) was about 0.71% by weight based upon the combined quantity of Components (A), (B), (C), (D) and (E).

The resultant mixture was poured into a Mylar® tray and was observed to suddenly solidify within about 45 seconds and was demolded within about 3 minutes after catalyst addition. The resultant solid, essentially bubble-free casting had the following properties:

| Density | >1 grams/cc |
|---|---|
| Hardness | 50 Barcol (No. 934-1 tester) |

EXAMPLE 10

The following components were thoroughly blended:

Component (A) — 50 grams of Polyol A.

Component (B) — 50 grams of Polyisocyanate A.

Component (C) — 50 grams of styrene having an atmospheric boiling point of about 145.2° C.

50 grams of the trimethacrylate ester of trimethylolpropane having a boiling point of 185° C at 5 mm Hg.

Component (D) — 0.4 cc (0.4 gram) of tertiarybutyl perbenzoate (density = about 1 g/cc).

Component (E) — 1 cc (1.14 gram) lead octoate (24% by weight lead) (density = about 1.14 g/cc).

The NCO:OH equivalent ratio was about 1:1.

The quantity of Component (C) was about 24.81% by weight based upon the combined weight of Components (A), (B), (C), (D) and (E).

The quantity of Component (D) was about 0.2% by weight based upon the combined quantity of Components (A), (B), (C), (D) and (E).

The quantity of Component (E) was about 0.57% by weight based upon the combined quantity of Components (A), (B), (C), (D) and (E).

The resultant mixture was poured into a Mylar® tray and was observed to suddenly solidify within about 120 seconds and was demolded within about 4 minutes after catalyst addition. The resultant solid, essentially bubblefree casting had the following properties:

| Density | >grams/cc |
|---|---|

-continued

| Hardness | 55 Barcol (No. 934-1 tester) |
|---|---|

EXAMPLE 11

The following components were thoroughly blended:

Component (A) — 50 grams of Polyol A.

Component (B) — 50 grams of Polyisocyanate A.

Component (C) — 50 grams of styrene having an atmospheric boiling point of about 145.2° C.

24 grams of the dimethacrylate ester of 1,3-butylene glycol having a boiling point of 110° C at 3 mm Hg.

Component (D) — 0.3 cc (0.3 gram) of tertiarybutyl perbenzoate (density = about 1 g/cc)

Component (E) — 1 cc (1.14 gram) of lead octoate (24% by weight lead) (density = about 1.14 g/cc).

The NCO-OH equivalent ratio was about 1:1.

The quantity of Component (C) was about 42.51% by weight based upon the combined weight of Components (A), (B), (C), (D) and (E).

The quantity of Component (D) was about 0.17% by weight based upon the combined quantity of Components (A), (B), (C), (D) and (E).

The quantity of Component (E) was about 0.65% by weight based upon the combined quantity of Components (A), (B), (C), (D) and (E).

The resultant mixture was poured into a Mylar® tray and was observed to suddenly solidify within about 120 seconds and was demolded within about 10 minutes after catalyst addition. The resultant solid, essentially bubble-free casting had the following properties:

| Density | >1 grams/cc |
|---|---|
| Hardness | 50 Barcol (No. 934-1 tester) |

EXAMPLE 12

The following components were thoroughly blended:

Component (A) — 30 grams of Polyol A.

Component (B) — 46 grams of Polyisocyanate C.

Component (C) — 30 grams of styrene having an atmospheric boiling point of about 145.2° C.

Component (D) — 0.5 cc (0.5 gram) of tertiarybutyl perbenzoate (density = about 1 g/cc)

Component (E) — 1 cc (1.14 gram) of lead octoate (24% by wt. lead) (density = about 1.14 g/cc)

The NCO:OH equivalent ratio was about 1:1.

The quantity of Component (C) was 27.87% by weight based upon the combined weight of Components (A), (B), (C), (D) and (E).

The quantity of Component (D) was about 0.46% by weight based upon the combined quantity of Components (A), (B), (C), (D) and (E).

The quantity of Component (E) was about 1.06% by weight based upon the combined quantity of Components (A), (B), (C), (D) and (E).

The resultant mixture was poured into a Mylar® tray and was observed to suddenly solidify within about 90 seconds and was demolded within about 3 minutes after catalyst addition. The resultant solid, essentially bubble-free casting had the following properties:

| Density | >1 grams/cc |
|---|---|
| Ultimate tensile strength | 11,522 psi (810.11 kg/cm$^2$) |
| Elongation | 17% |

-continued

| Hardness | 30 Barcol (No. 934-1 tester) |
|---|---|

EXAMPLE 13

The following components were thoroughly blended:
Component (A) — 30 grams of Polyol A.
Component (B) — 46 grams of Polyisocyanate C.
Component (C) — 30 grams of styrene having an atmospheric boiling point of about 145.2° C.
Component (D) — 0.5 cc (0.5 gram) of tertiarybutyl perbenzoate (density = about 1 g/cc).
Component (E) — 1 cc (1.15 gram) of antimony octoate (density = about 1.15 g/cc)

The NCO:OH equivalent ratio was about 1:1.

The quantity of Component (C) was about 27.87% by weight based upon the combined weight of Components (A), (B), (C), (D) and (E).

The quantity of Component (D) was about 0.46% by weight based upon the combined quantity of Components (A), (B), (C), (D) and (E).

The quantity of Component (E) was about 1.07% by weight based upon the combined quantity of Components (A), (B), (C), (D) and (E).

The resultant mixture was poured into a Mylar® tray and was observed to suddenly solidify within about 120 seconds and was demolded within about 4 minutes after catalyst addition. The resultant solid, essentially bubble-free casting had the following properties:

| Density | >1 gram/cc |
|---|---|
| Hardness | 35 Barcol (No. 934-1 tester) |

EXAMPLE 14

The following components were thoroughly blended:
Component (A) — 30 grams of Polyol A.
Component (B) — 46 grams of Polyisocyanate C.
Component (C) — 30 grams of styrene having an atmospheric boiling point of about 145.2° C.
Component (D) — 0.5 cc (0.5 gram) of tertiarybutyl perbenzoate (density = about 1 g/cc).
Component (E) — 1 cc (0.96 gram) of zinc naphthenate (density = about 0.96 g/cc).

The NCO:OH equivalent ratio was about 1:1.

The quantity of Component (C) was about 27.92% by weight based upon the combined weight of Components (A), (B), (C), (D) and (E).

The quantity of Component (D) was about 0.47% by weight based upon the combined quantity of Components (A), (B), (C), (D) and (E).

The quantity of Component (E) was about 0.89% by weight based upon the combined quantity of Components (A), (B), (C), (D) and (E).

The resultant mixture was poured into a Mylar® tray and was observed to suddenly solidify within about 120 seconds and was demolded within about 4 minutes after catalyst/polyisocyanate addition. The resultant solid, essentially bubble-free casting had the following property:

| Density | >1 gram/cc |
|---|---|

EXAMPLE 15

The following components were thoroughly blended:
Component (A) — 45 grams of Polyol C.
Component (B) — 80 grams of Polyisocyanate B.
Component (C) — 40 grams of styrene having an atmospheric boiling point of about 145.2° C.
Component (D) — 0.5 cc (0.5 gram) of tertiarybutyl perbenzoate (density = about 1 g/cc.)
Component (E) — Not present The NCO:OH equivalent ratio was about 0.95:1.

The quantity of Component (C) was about 24.17% by weight based upon the combined weight of Components (A), (B), (C), (D) and (E).

The quantity of Component (D) was about 0.3% by weight based upon the combined quantity of Components (A), (B), (C), (D) and (E).

The resultant mixture was poured into a Mylar® tray and was observed to suddenly solidify within about 60 seconds and was demolded within about 2 minutes after polyisocyanate addition. The resultant solid, essentially bubble-free casting had the following properties:

| Density | >1 gram/cc |
|---|---|
| Ultimate tensile strength | 14,107 psi (991.86 kg/cm$^2$) |
| Elongation | 10% |
| Hardness | 45 Barcol (No. 934-1 tester) |

EXAMPLE 16

The following components were thoroughly blended:
Component (A) — 35 grams of Polyol C.
Component (B) — 50 grams of Polyisocyanate C.
Component (C) — 35 grams of styrene having an atmospheric boiling point of about 145.2° C.
Component (D) — 0.5 grams of azobisisobutyronitrile.
Component (E) — Not present The NCO:OH equivalent ratio was about 0.74:1.

The quantity of Component (C) was about 29.05% by weight based upon the combined weight of Components (A), (B), (C), (D) and (E).

The quantity of Component (D) was about 0.41% by weight based upon the combined quantity of Components (A), (B), (C), (D) and (E).

The resultant mixture was poured into a Mylar® tray and was observed to suddenly solidify within about 30 seconds and was demolded within about 3 minutes after polyisocyanate addition. The resultant solid, ½ inch thick, essentially bubble-free casting had the following properties:

| Density | >1 gram/cc |
|---|---|
| Hardness | 30-40 Barcol (No. 934-1 tester) |

EXAMPLE 17

The following components were thoroughly blended:
Component (A) — 35 grams of Polyol A.
Component (B) — 75 grams of Polyisocyanate D.
Component (C) — 25 grams of styrene having an atmospheric boiling point of about 145.2° C.
Component (D) — 0.6 cc (0.6 gram) of tertiarybutylperoxy isopropyl carbonate (density = about 1 g/cc)
Component (E) — 1 cc (1.14 gram) of lead octoate (24% by wt. lead) (density = about 1.14 g/cc)

The NCO:OH equivalent ratio was about 1:1.

The quantity of Component (C) was about 18.28% by weight based upon the combined weight of Components (A), (B), (C), (D) and (E).

The quantity of Component (D) was about 0.44% by weight based upon the combined quantity of Components (A), (B), (C), (D) and (E).

The quantity of Component (E) was about 0.83% by weight based upon the combined quantity of Components (A), (B), (C), (D) and (E).

The resultant mixture was poured into a Mylar® tray and was observed to suddenly soldiify within about 45 seconds and was demolded within about 2 minutes after catalyst addition. The resultant solid, ¼ inch thick, essentially bubble-free casting had the following properties:

| | |
|---|---|
| Density | >1 gram/cc |
| Ultimate tensile strength | 11,935 psi (839,15 kg/cm²) |
| Elongation | 11% |
| Hardness | 10–20 Barcol (No. 934–1 tester) |

COMPARATIVE EXPERIMENT C: (Component B is a prepolymer having a % NCO below about 12% which results in a product having poor physical properties)

Component (A) — 30 grams of Polyol A.

Component (B) — 110 grams of Polyisocyanate E.

Component (C) — 30 grams of styrene having an atmospheric boiling point of about 145.2° C.

Component (D) — 1 cc (1 gram) of tertiarybutylperoxy isopropyl carbonate (density = about 1 g/cc)

Component (E) — 1.25 cc (1.43 grams) of lead octoate (24% by weight lead) (density = about 1.14 g/cc)

The NCO:OH equivalent ratio was about 0.94:1.

The quantity of Component (C) was about 17.4% by weight based upon the combined weight of Components (A), (B), (C), (D) and (E).

The quantity of Component (D) was about 0.58% by weight based upon the combined quantity of Components (A), (B), (C), (D) and (E).

The quantity of Component (E) was about 0.83% by weight based upon the combined quantity of Components (A), (B), (C), (D) and (E).

The resultant mixture was poured into a Mylar® tray and was observed to slowly solidify within about 3 minutes and was demolded within about 8 minutes after catalyst addition. The resultant solid ¼ inch thick, essentially bubble-free casting had a maximum exotherm of about 74° C and had the following properties:

| | |
|---|---|
| Ultimate tensile strength | 293 psi (20.6 kg/cm²) |
| Elongation | 196% |

EXAMPLE 18

The following components were thoroughly blended:

Component (A) — 30 grams of Polyol A.

Component (B) — 46 grams of Polyisocyanate C.

Component (C) — 30 grams of vinyl toluene having an atmospheric boiling point of about 167° C.

Component (D) — 0.6 cc (0.6 grams) of tertiarybutyl perbenzoate (density = about 1 g/cc).

Component (E) — 1 cc (1.14 gram) of lead octoate (24% by wt. lead) (density = about 1.14 g/cc).

The NCO-OH equivalent ratio was about 1:1.

The quantity of Component (C) was about 27.84% by weight based upon the combined weight of Components (A), (B), (C), (D) and (E).

The quantity of Component (D) was about 0.56% by weight based upon the combined quantity of Components (A), (B), (C), (D) and (E).

The quantity of Component (E) was about 1.06% by weight based upon the combined quantity of Components (A), (B), (C), (D) and (E).

The resultant mixture was poured into a Mylar® tray and was observed to suddenly solidify within about 30 seconds and was demolded within about 2 minutes after catalyst addition. The resultant solid, essentially bubble-free casting had the following properties:

| | |
|---|---|
| Density | >1 gram/cc |
| Ultimate tensile strength | 11,666 psi (820.24 kg/cm²) |
| Elongation | 13% |
| Hardness | 35–40 Barcol (No. 934–1 tester) |

COMPARATIVE EXPERIMENT D: (No vinyl polymerization catalyst present which results in a product having poor physical properties)

Component (A) — 30 grams of Polyol A.

Component (B) — 46 grams of Polyisocyanate C.

Component (C) — 30 grams of vinyl toluene having an atmospheric boiling point of about 167° C.

Component (D) — None Present

Component (E) — 1 cc (1.14 gram) of lead octoate (24% by weight lead) (density = about 1.14 g/cc)

The NCO:OH equivalent ratio was about 1:1.

The quantity of Component (C) was about 28% by weight based upon the combined weight of Components (A), (B), (C), (D) and (E).

The quantity of Component (E) was 1.06% by weight based upon the combined quantity of Components (A), (B), (C), (D) and (E).

The resultant mixture was poured into a Mylar® tray and was observed to suddenly solidify within about 30 seconds and was demolded within about 2 minutes after catalyst addition. The resultant solid, essentially bubble-free casting had the following properties:

| | |
|---|---|
| Density | >1 grams/cc |
| Hardness | <2 Barcol (No. 934–1 tester) |

COMPARATIVE EXPERIMENT E: (No catalyst for urethane formation present which results in a composition which cannot be demolded within 15 minutes or less)

Component (A) — 30 grams of Polyol A.

Component (B) — 46 grams of Polyisocyanate C.

Component (C) — 30 grams of vinyl toluene having an atmospheric boiling point of about 167° C.

Component (D) — 0.6 cc (0.6 gram) of tertiarybutyl perbenzoate (density = about 1 g/cc)

Component (E) — not employed.

The NCO:OH equivalent ratio was about 1:1.

The quantity of Component (C) was about 28.14% by weight based upon the combined weight of Components (A), (B), (C), (D) and (E).

The quantity of Component (D) was about 0.56% by weight based upon the combined quantity of Components (A), (B), (C), (D) and (E).

The resultant mixture was poured into a Mylar® tray and was observed to still be a liquid about 40 minutes after catalyst addition.

EXAMPLE 19

The following components were thoroughly blended:

Component (A) — 30 grams of Polyol A.

Component (B) — 45 grams of Polyisocyanate B.

Component (C) — 65 grams of styrene having an atmospheric boiling point of about 145.2° C.

Component (D) — 0.08 grams of azobisisobutyronitrile.

Component (E) — 1 cc (1.14 grams) of lead octoate (24% by weight lead) (density = about 1.14 g/cc).

The NCO:OH equivalent ratio was about 1:1.

The quantity of Component (C) was about 46.03% by weight based upon the combined weight of Components (A), (B), (C), (D) and (E).

The quantity of Component (D) was about 0.06% by weight based upon the combined quantity of Components (A), (B), (C), (D) and (E).

The quantity of Component (E) was about 0.81% by weight based upon the combined quantity of Components (A), (B), (C), (D) and (E).

The resultant mixture was poured into a Mylar® tray and was observed to suddenly solidify within about 1 minutes and was demolded within about 4 minutes after catalyst addition. The resultant solid, essentially bubble-free casting had the following properties:

| | |
|---|---|
| Density | >1 gram/cc |
| Ultimate tensile strength | 3863 psi (271.61 kg/cm$^2$) |
| Elongation | 28% |

EXAMPLE 20

The following components were thoroughly blended:

Component (A) — 30 grams of Polyol A

Component (B) — 45 grams of Polyisocyanate B

Component (C) — 50 grams of styrene having an atmospheric boiling point of about 145.2° C Component (D) — 0.3 cc (0.3 gram) of tertiarybutyl perbenzoate (density = about 1 g/cc)

Component (E) — 0.2 cc (0.23 gram) of lead octoate (24% by wt. lead) (density = about 1.14 g/cc) plus 1.0 cc (1.04 gram) of a 33% solution (by weight) of triethylenediamine in dipropyleneglycol (density = about 1.04 g/cc)

The NCO:OH equivalent ratio was about 1:1.

The quantity of Component (C) was about 39.83% by wt. based upon the combined weight of Components (A), (B), (C), (D) and (E). The quantity of Component (D) was about 0.24% by wt. based upon the combined quantity of Components (A), (B), (C), (D) and (E).

The quantity of Component (E) was about 1.01% by wt. based upon the combined quantity of Components (A), (B), (C), (D) and (E).

The resultant mixture was poured into a Mylar® tray and was observed to suddenly solidify within about 60 seconds and was demolded within about 5 minutes after catalyst addition. The resultant solid, essentially bubble-free casting had the following properties:

| | |
|---|---|
| Density | >1 gram/cc |
| Ultimate Tensile strength | 8238 psi (579.21 kg/cm$^2$) |
| Elongation | 11% |
| Exotherm temperature | about >120° C |

EXAMPLE 21

The following components were thoroughly blended:

Component (A) — 23 grams of Polyol D.

Component (B) — 45 grams of Polyisocyanate C.

Component (C) — 50 grams of vinyl toluene having an atmospheric boiling point of about 167° C.

Component (D) — 0.6 cc (0.6 gram) of tertiarybutyl perbenzoate (density = about 1 g/cc).

Component (E) — 1 cc (1.14 gram) of lead octoate (24% by weight lead) (density = about 1.14 g/cc).

The NCO:OH equivalent ratio was about 1:1.

The quantity of Component (C) was 41.76% by weight based upon the combined weight of Components (A), (B), (C), (D) and (E).

The quantity of Component (D) was about 0.5% by weight based upon the combined quantity of Components (A), (B), (C), (D) and (E).

The quantity of Component (E) was about 0.95% by weight based upon the combined quantity of Components (A), (B), (C), (D) and (E).

The resultant mixture was poured into a Mylar® tray and was observed to suddenly solidify within about 60 seconds and was demolded within about 5 minutes after catalyst addition. The resultant solid, essentially bubble-free casting had the following properties:

| | |
|---|---|
| Density | >1 gram/cc |
| Ultimate tensile strength | 4785 psi (336.43 kg/cm$^2$) |
| Elongation | 5% |
| Exotherm Temperature | about >120° C |

COMPARATIVE EXPERIMENT F: (Polyol component equivalent weight about about 250 which results in a product having poor physical properties)

The following components were thoroughly blended:

Component (A) — 50 grams of Polyol E.

Component (B) — 13.5 grams of Polyisocyanate C.

Component (C) — 25 grams of vinyl toluene having an atmospheric boiling point of about 167° C.

Component (D) — 0.6 cc (0.6 gram) of tertiarybutyl perbenzoate (density = about 1 g/cc).

Component (E) — 0.6 cc (0.6 gram) of lead octoate (24% by weight lead) (density = about 1.14 g/cc).

The NCO:OH equivalent ratio was about 1:1.

The quantity of Component (C) was about 27.85% by weight based upon the combined weight of Components (A), (B), (C), (D) and (E).

The quantity of Component (D) was about 0.67% by weight based upon the combined quantity of Components (A), (B), (C), (D) and (E).

The quantity of Component (E) was about 0.76% by weight based upon the combined quantity of Components (A), (B), (C), (D) and (E).

The resultant mixture was poured into a Mylar® tray and was observed to suddenly solidify within about 4 minutes and was demolded within about 24 hours after catalyst addition. The maximum exotherm was about <50° C. The resultant solid, very flexible, very soft, slightly tacky, essentially bubble-free casting had the following properties:

| | |
|---|---|
| Density | >1 gram/cc |
| Ultimate tensile strength | 333 psi (23.41 kg/cm ) |
| Elongation | 20% |
| Hardness | 10 Shore D |

EXAMPLE 22

The following components were thoroughly blended:

Component (A) — 30 grams of Polyol A.

Component (B) — 33 grams of Polyisocyanate F.

Component (C) — 30 grams of styrene having an atmospheric boiling point of about 145.2° C.

Component (D) — 0.5 cc (0.5 gram) of tertiarybutyl perbenzoate (density = about 1 g/cc).

Component (E) — 1 cc (1.14 gram) of lead octoate (24% by weight lead) (density = about 1.14 g/cc).

The NCO:OH equivalent ratio was about 1.03:1.

The quantity of Component (C) was about 31.7% by weight based upon the combined weight of Components (A), (B), (C), (D) and (E).

The quantity of Component (D) was about 0.53% by weight based upon the combined quantity of Components (A), (B), (C), (D) and (E).

The quantity of Component (E) was about 1.2% by weight based upon the combined quantity of Components (A), (B), (C), (D) and (E).

The resultant mixture was poured into a Mylar ® tray and was observed to suddenly solidify within about 60 seconds and was demolded within about 10 minutes after catalyst addition. The resultant solid, rigid, essentially bubble-free casting had the following properties:

| | |
|---|---|
| Density | >1 gram/cc |
| Hardness | 10–20 Barcol (No. 934-1 tester) |

EXAMPLE 23

The following components were thoroughly blended:

Component (A) — 30 grams of Polyol A.

Component (B) — 43 grams of Polyisocyanate G.

Component (C) — 30 grams of styrene having an atmospheric boiling point of about 145.2° C.

Component (D) — 0.5 cc (0.5 gram) of tertiarybutyl perbenzoate (density = about 1 g/cc)

Component (E) — 1 cc (1.14 gram) of lead octoate (24% by wt. lead) (density = about 1.14 g/cc)

The NCO:OH equivalent ratio was about 1:1.

The quantity of Component (C) was about 28.67% by weight based upon the combined weight of Components (A), (B), (C), (D) and (E).

The quantity of Component (D) was about 0.48% by weight based upon the combined quantity of Components (A), (B), (C), (D) and (E).

The quantity of Component (E) was about 0.01% by weight based upon the combined quantity of Components (A), (B), (C), (D) and (E).

The resultant mixture was poured into a Mylar ® tray and was observed to suddenly solidify within about 30 seconds and was demolded within about 5 minutes after catalyst addition. The resultant solid, rigid, essentially bubble-free casting had the following properties:

| | |
|---|---|
| Density | >1 grams/cc |
| Hardness | 20–30 Barcol (No. 934-1 tester) |

EXAMPLE 24

The following components were thoroughly blended:

Component (A) — 50 grams of Polyol A.

Component (B) — 50 grams of Polyisocyanate A.

Component (C) — 50 grams of vinyl benzyl chloride having an atmospheric boiling point of about 229° C.

Component (D) — 0.5 cc (0.5 gram) of tertiarybutyl perbenzoate (density = about 1 g/cc).

Component (E) — 0.5 cc (0.57 gram) of lead octoate (24% by wt. lead) (density = about 1.14 g/cc).

The NCO:OH equivalent ratio was about 1:1.

The quantity of Component (C) was about 33.1% by weight based upon the combined weight of Components (A), (B), (C), (D) and (E).

The quantity of Component (E) was about 0.38% by weight based upon the combined quantity of Components (A), (B), (C), (D) and (E).

The resultant mixture was poured into a Mylar ® tray and was observed to suddenly solidify within about 30 seconds and was demolded within about 2 minutes after catalyst addition. The resultant solid, rigid, essentially bubble-free casting had the following properties:

| | |
|---|---|
| Density | >1 gram/cc |
| Ultimate tensile strength | 8500 psi (597.64 kg/cm²) |
| Elongation | 10% |
| Hardness | 30 Barcol (No. 934-1 tester) |

The maximum exotherm was in excess of about 120° C.

EXAMPLE 25

The following components were thoroughly blended:

Component (A) — 50 grams of Polyol A.

Component (B) — 75 grams of Polyisocyanate B.

Component (C) — 75 grams of chlorostyrene having an atmospheric boiling point of about 177°–185° C.

Component (D) — 1 cc (1 gram) of tertiarybutyl perbenzoate (density = about 1 g/cc).

Component (E) — 1 cc (1.14 gram) of lead octoate (24% by weight lead) (density = about 1.14 g/cc).

The NCO:OH equivalent ratio was about 1:1.

The quantity of Component (C) was about 37.1% by weight based upon the combined weight of Components (A), (B), (C), (D) and (E).

The quantity of Component (D) was about 0.49% by weight based upon the combined quantity of Components (A), (B), (C), (D) and (E).

The quantity of Component (E) was about 0.56% by weight based upon the combined quantity of Components (A), (B), (C), (D) and (E).

The resultant mixture was poured into a Mylar ® tray and was observed to suddenly solidify within about 30 seconds and was demolded within less than about 10 minutes after catalyst addition. The resultant solid, essentially bubble-free casting had the following properties:

| | |
|---|---|
| Density | >1 gram/cc |
| Ultimate tensile strength | 12,200 psi (857.78 kg/cm²) |
| Elongation | 11% |
| Hardness | 30–40 Barcol (No. 934-1 tester) |

The maximum exotherm was about 110° C.

EXAMPLE 26

The following components were thoroughly blended:

Component (A) — 50 grams of Polyol A.

Component (B) — 75 grams of Polyisocyanate B.

Component (C) — 50 grams of styrene having an atmospheric boiling point of about 145.2° C.

Component (D) — 0.1 cc (0.1 gram) of tertiarybutyl perbenzoate (density = about 1 g/cc).

Component (E) — 1 cc (1.14 gram) of lead octoate (24% by wt. lead) (density = about 1.14 g/cc).

The NCO:OH equivalent ratio was about 1:1.

The quantity of Component (C) was about 28.37% by weight based upon the combined weight of Components (A), (B), (C), (D) and (E).

The quantity of Component (D) was about 0.06% by weight based upon the combined quantity of Components (A), (B), (C), (D) and (E).

The quantity of Component (E) was about 0.65% by weight based upon the combined quantity of Components (A), (B), (C), (D) and (E).

The resultant mixture was poured into a Mylar ® tray and was observed to suddenly solidify within about 60 seconds and was demolded within about 6 minutes after catalyst addition. The resultant solid, essentially bubble-free casting had the following properties:

| | |
|---|---|
| Density | >1 grams/cc |
| Ultimate tensile strength | 9214 psi (647.74 kg/cm$^2$) |
| Elongation | 23% |
| Hardness | >85 Shore D |

COMPARATIVE EXPERIMENT G: (Quantity of Component (D) below about 0.05% which resulted in a product having an elongation value greater than 100%.)

The following components were thoroughly blended:

Component (A) — 50 grams of Polyol A.

Component (B) — 75 grams of Polyisocyanate B.

Component (C) — 50 grams of styrene having an atmospheric boiling point of about 145.2° C.

Component (D) — 0.02 cc (0.02 gram) of tertiarybutyl perbenzoate (density = about 1 g/cc).

Component (E) — 1 cc (1.14 grams) of lead octoate (24% by wt. lead) (density = about 1.14 g/cc).

The NCO:OH equivalent ratio was 1:1.

The quantity of Component (C) was about 28.38% by weight based upon the combined weight of Components (A), (B), (C), (D) and (E).

The quantity of Component (D) was about 0.01% by weight based upon the combined quantity of Components (A), (B), (C), (D) and (E).

The quantity of Component (E) was about 0.65% by weight based upon the combined quantity of Components (A), (B), (C), (D) and (E).

The resultant mixture was poured into a Mylar ® tray and was observed to suddenly solidify within about 60 seconds and was demolded within about 6 minutes after catalyst addition. The resultant solid, rigid, essentially bubble-free casting had the following properties:

| | |
|---|---|
| Density | >1 gram/cc |
| Ultimate tensile strength | 1166 psi (81.98 kg/cm$^2$) |
| Elongation | 132% |
| Hardness | 40 Shore D |

EXAMPLE 27

The following components were thoroughly blended:

Component (A) — 50 grams of Polyol A

Component (B) — 75 grams of Polyisocyanate B

Component (C) — 50 grams of styrene having an atmospheric boiling point of about 145.2° C Component (D) — 1 cc (1 gram) of tertiarybutyl perbenzoate (density = about 1 g/cc)

Component (E) — 3 cc (3.12 grams) of a 33% solution (by wt.) of triethylenediamine in dipropyleneglycol (density = about 1.04 g/cc)

The NCO:OH equivalent ratio was about 1:1.

The quantity of Component (C) was about 28.24% by weight based upon the combined weight of Components (A), (B), (C), (D), and (E).

The quantity of Component (D) was about 0.56% by weight based upon the combined quantity of Components (A), (B), (C), (D) and (E).

The quantity of Component (E) was about 0.58% by weight based upon the combined quantity of Components (A), (B), (C), (D) and (E).

The resultant mixture was poured into a Mylar ® tray and was observed to suddenly solidify within about 3 minutes and was demolded within about 10 minutes after catalyst addition. The resultant solid, rigid, ¼-inch thick, essentially bubblefree casting had the following properties:

| | |
|---|---|
| Density | >1 gram/cc |
| Ultimate tensile strength | 10333 psi (726.41 kg/cm$^2$) |
| Elongation | 10% |
| Hardness | 40 Barcol (No. 934-1 tester) |

The maximum exotherm temperature was in excess of 100° C.

EXAMPLE 28

The following components were thoroughly blended:

Component (A) — 50 grams of Polyol A

Component (B) — 75 grams of Polyisocyanate B

Component (C) — 50 grams of styrene having an atmospheric boiling point of about 145.2° C Component (D) — 1 cc (1 gram) of tertiarybutyl perbenzoate (density = about 1 g/cc)

Component (E) — 1 cc (1.04 gram) of dibutyl tin dilaurate (density = about 1.04 g/cc)

The NCO:OH equivalent ratio was about 1:1.

The quantity of Component (C) was about 28.24% by weight based upon the combined weight of Components (A), (B) (C), (D) and (E).

The quantity of Component (D) was about 0.56% by weight based upon the combined quantity of Components (A), (B), (C), (D) and (E).

The quantity of Component (E) was about 0.59% by weight based upon the combined quantity of Components (A), (B), (C), (D) and (E).

The resultant mixture was poured into a Mylar ® tray and was observed to suddenly solidify within about 3 minutes and was demolded within about 15 minutes after catalyst addition. The resultant solid, rigid, essentially bubble-free casting had the following properties:

| | |
|---|---|
| Density | >1 gram/cc |
| Ultimate tensile strength | 13000 psi (914.03 kg/cm$^2$) |
| Elongation | 12% |
| Hardness | 30-40 Barcol (No. 934-1 tester) |

The maximum exotherm was in excess of 100° C.

EXAMPLE 29

The following components were thoroughly blended:

Component (A) — 50 grams of Polyol A

Component (B) — 75 grams of Polyisocyanate B

Component (C) — 50 grams of styrene having an atmospheric boiling point of about 145.2° C Component (D) — 1 cc (1 gram) of tertiarybutyl perbenzoate (density = about 1 g/cc)

Component (E) — 1 cc (0.98 gram) of a mixture of 1 gram of lead octoate in 49 grams of dioctylphthalate (density = about 0.98 g/cc)

The NCO:OH equivalent ratio was about 1:1.

The quantity of Component (C) was about 28.41% by weight based upon the combined weight of Components (A), (B), (C), (D) and (E).

The quantity of Component (D) was about 0.57% by weight based upon the combined quantity of Components (A), (B), (C), (D) and (E).

The quantity of Component (E) was about 0.01% by weight based upon the combined quantity of Components (A), (B), (C), (D) and (E).

The resultant mixture was poured into a Mylar® tray and was observed to suddenly solidify within about 5 minutes and was demolded within about 15 minutes after catalyst addition. The resultant solid, rigid, ¼-inch (0.64 cm) thick, essentially bubble-free casting had the following properties:

| | |
|---|---|
| Density | 1 gram/cc |
| Ultimate tensile strength | 12833 psi (902.29 kg/cm ) |
| Elongation | 14% |
| Hardness | 90 Shore D |

The maximum exotherm temperature was about 150° C.

When the above formulation was cast into a Mylar® tray to a thickness of about 1/16 inch (0.15 cm) it did not completely cure, i.e. it was soft and flexible and had a Shore D hardness of less than 20.

COMPARATIVE EXPERIMENT H — (quantity of urethane catalyst, component (E), too low i.e., not an effective quantity).

The following components were thoroughly blended:

Component (A) — 50 grams of Polyol A

Component (B) — 75 grams of Polyisocyanate B

Component (C) — 50 grams of styrene having an atmospheric boiling point of about 145.2° C Component (D) — 1 cc (1 gram) of tertiarybutyl perbenzoate (density = about 1 g/cc)

Component (E) — 0.2 cc (0.2 gram) of a mixture of 1 gram of lead octoate (24% by weight lead) in 49 grams of dioctylphthalate (density = about 0.98 g/cc).

The NCO:OH equivalent ratio was about 1:1.

The quantity of Component (C) was about 28.41% by wt. based upon the combined weight of Components (A), (B), (C), (D) and (E).

The quantity of Component (D) was about 0.57% by wt. based upon the combined quantity of Components (A), (B), (C), (D) and (E).

The quantity of Component (E) was about 0.002% by wt. based upon the combined quantity of Components (A), (B), (C), (D) and (E).

The resultant mixture was poured into a Mylar® tray and was observed to remain a liquid within about 2 hours after catalyst addition. After subsequent demolding the resultant soft, flexible, ¼-inch (0.64 cm) thick casting had the following properties:

| | |
|---|---|
| Density | 0.31 gram/cc |
| Hardness | <20 Shore D |

The maximum exotherm was observed to be about 40° C.

EXAMPLE 30

The following components were thoroughly blended:

Component (A) — 60 grams of Polyol A.

Component (B) — 86 grams of Polyisocyanate G.

Component (C) — 76 grams of styrene having an atmospheric boiling point of about 145.2° C.

Component (D) — 1 cc (1 gram) of tertiarybutyl perbenzoate (density = about 1 g/cc).

Component (E) — 1 cc (1.14 grams) of lead octoate (24% by wt. lead) (density = about 1.14 g/cc).

The NCO:OH equivalent ratio was about 1:1.

The quantity of Component (C) was about 33.91% by weight based upon the combined weight of Components (A), (B), (C), (D) and (E).

The quantity of Component (D) was about 0.45% by weight based upon the combined quantity of Components (A), (B), (C), (D) and (E).

The quantity of Component (E) was about 0.51% by weight based upon the combined quantity of Components (A), (B), (C), (D) and (E).

The resultant mixture was poured into a Mylar® tray and was observed to suddenly solidify within about 25 seconds and was demolded within about 3 minutes after catalyst/polyisocyanate addition. The resultant solid, essentially bubble-free casting had the following properties:

| | |
|---|---|
| Density | >1 gram/cc |
| Ultimate tensile strength | 10,050 psi (706.62 kg/cm$^2$) |
| Elongation | 13% |
| Hardness | >85 Shore D |

COMPARATIVE EXPERIMENT I — (equivalent weight of polyol above 250)

The following components were thoroughly blended:

Component (A) — 120 grams of Polyol F

Component (B) — 15 grams of Polyisocyanate G

Component (C) — 61 grams of styrene having an atmospheric boiling point of about 145.2° C Component (D) — 1 cc (1 gram) of tertiarybutyl perbenzoate (density = about 1 g/cc)

Component (E) — 1 cc (1.14 grams) of lead octoate (24% lead by wt.) (density = about 1.14 g/cc)

The NCO:OH equivalent ratio was about 1:1.

The quantity of Component (C) was about 30.79% by weight based upon the combined weight of Components (A), (B), (C), (D) and (E).

The quantity of Component (D) was about 0.5% by weight based upon the combined quantity of Components (A), (B), (C), (D) and (E).

The quantity of Component (E) was about 0.58% by weight based upon the combined quantity of Components (A), (B), (C), (D) and (E).

The resultant mixture was poured into a Mylar® tray and was observed to solidify into a tacky solid within about 3 minutes and was demolded within about 60 minutes after catalyst/polyisocyanate addition. The peak exotherm temperature was about 41° C. After 4 days at room temperature, the resultant transparent casting had lost 39 grams (19.6%) of its weight (believed to be styrene monomer by evaporation). The casting had the following properties:

| | |
|---|---|
| Density | >1 gram/cc |

-continued

| | |
|---|---|
| Ultimate tensile strength | 78 psi (5.48 kg/cm$^2$) |
| Elongation | >100% |

COMPARATIVE EXPERIMENT J: (Boiling point of Component (C) too low)

The following components were thoroughly blended:

Component (A) — 50 grams of Polyol A.

Component (B) — 75 grams of Polyisocyanate B.

Component (C) — 50 grams of vinyl acetate having an atmospheric boiling point of about 73° C.

Component (D) — 1 cc (1 gram) of tertiarybutyl perbenzoate (density = about 1 g/cc).

Component (E) — 1 cc (1.14 grams) of lead octoate (24% by wt. lead) (density = about 1.14 g/cc).

The NCO:OH equivalent ratio was about 1:1.

The quantity of Component (C) was about 28.23% by weight based upon the combined weight of Components (A), (B), (C), (D) and (E).

The quantity of Component (D) was about 0.56% by weight based upon the combined quantity of Components (A), (B), (C), (D) and (E).

The quantity of Component (E) was about 0.64% by weight based upon the combined quantity of Components (A), (B), (C), (D) and (E).

The resultant mixture was poured into a Mylar® tray; within 1 minute after catalyst addition, this blend bubbled and expelled vapors and finally solidified into a cracked bubble-filled distorted mass.

EXAMPLE 31

The following components were thoroughly blended:

Component (A) — 52 grams of Polyol G; 13 grams of Polyol I

Component (B) — 50 grams of a mixture containing 25% polyisocyanate H and 75% of Polyisocyanate A, the resultant blend having an NCO equivalent weight of about 99.

Component (C) — 50 grams of vinyl toluene having an atmospheric boiling point of about 167° C. 20 grams of N-vinyl pyrrolidone having a boiling point of about 96° C at 14 mm Hg.

Component (D) — 1 cc (0.9 gram) of tertiarybutyl peracetate (density = about 0.9 g/cc). 1 cc (1 gram) of 2,5-dimethylhexane diperoxy 2-ethyl hexoate (density = about 1 g/cc).

Component (E) — 0.5 cc (0.45 gram) of manganese octoate (6% by wt. Mn) (density = about 0.9 g/cc)

The NCO:OH equivalent ratio was about 1:1.

The quantity of Component (C) was about 37.24% by weight based upon the combined weight of Components (A), (B), (C), (D) and (E).

The quantity of Component (D) was about 1.01% by weight based upon the combined quantity of Components (A), (B), (C), (D) and (E).

The quantity of Component (E) was about 0.56% by weight based upon the combined quantity of Components (A), (B), (C), (D) and (E).

The resultant mixture was poured into a polytetrafluoroethylene coated thin walled, about 0.6 mm, aluminum tray and was observed to suddenly solidify within about 45 seconds and was demolded within about 3 minutes after catalyst addition. The maximum exotherm temperature was observed to be about 140° C. The resultant solid, rigid 3/8-inch (0.97 cm) thick, essentially bubble-free casting had the following properties:

| | |
|---|---|
| Density | >1 gram/cc |
| Hardness | >85 Shore D<br>10–20 Barcol (No. 934-1 tester) |

EXAMPLE 32

The following components were thoroughly blended:

Component (A) — 50 grams of Polyol A

Component (B) — 75 grams of Polyisocyanate C

Component (C) — 25 grams of vinyl toluene having an atmospheric boiling point of about 167° C; 25 grams of methyl methacrylate having an atmospheric boiling point of about 100° C Component (D) — 1 cc (0.9 gram) of tertiarybutyl peracetate (density = about 0.9 g/cc)

Component (E) — 1 cc (1.14 grams) of lead octoate (24% lead by weight); (density = about 1.14 g/cc)

The NCO:OH equivalent ratio was about 0.98:1.

The quantity of Component (C) was about 28.24% by weight based upon the combined weight of Components (A), (B), (C), (D) and (E).

The quantity of Component (D), was about 0.51% by weight based upon the combined quantity of Components (A), (B), (C), (D) and (E).

The quantity of Component (E) was about 0.64% by weight based upon the combined quantity of Components (A), (B), (C), (D) and (E).

The resultant mixture was poured into a Mylar® tray and was observed to suddenly solidify within about 60 seconds and was demolded within about 4 minutes after catalyst addition. The maximum exotherm temperature was observed to be in excess of about 90° C. The resultant solid, rigid, ¼-inch (0.64 cm) thick, essentially bubble-free casting had the following properties;

| | |
|---|---|
| Density | >1 gram/cc |
| Hardness | 30–40 Barcol (No. 934-1 tester) |

COMPARATIVE EXPERIMENT K: (Quantity of vinyl monomer too high)

The following components were thoroughly blended:

Component (A) — 20 grams of Polyol A.

Component (B) — 20 grams of Polyisocyanate A.

Component (C) — 80 grams of 2-ethylhexyl acrylate having an atmospheric boiling point of about 214°–218° C.

Component (D) — 1 cc (1 gram) of tertiarybutyl perbenzoate (density = about 1 g/cc)

Component (E) — 1 cc (1.14 grams) of lead octoate (24% lead by wt; density = about 1.14 g/cc).

The NCO:OH equivalent ratio was about 1:1.

The quantity of Component (C) was about 65.5% by weight based upon the combined weight of Components (A), (B), (C), (D) and (E).

The quantity of Component (D) was about 0.82% by weight based upon the combined quantity of Components (A), (B), (C), (D) and (E).

The quantity of Component (E) was about 0.93% by weight based upon the combined quantity of Components (A), (B), (C), (D) and (E).

The resultant mixture was poured into a Mylar® tray and was observed to separate into 2 phases within about 2½ minutes after catalyst addition. The top phase was a clear liquid which was shown by infrared analysis to be 2-ethyl hexyl acrylate. The lower phase was a curd-like opaque mass.

EXAMPLE 33

The following components were thoroughly blended:

Component (A) — 50 grams of Polyol A.

Component (B) — 75 grams of Polyisocyanate C.

Component (C) — 50 grams of vinyl toluene having an atmospheric boiling point of about 167° C.

Component (D) — 1 cc (0.9 gram) of tertiarybutyl peracetate (density = about 0.9 g/cc).

Component (E) — 10 grams of an adduct of glycerine and propylene oxide having an OH equivalent weight of about 150 and containing 3.27 weight % potassium hydroxide.

The NCO:OH equivalent ratio was about 0.89:1.

The quantity of Component (C) was about 26.9% by weight based upon the combined weight of Components (A), (B), (C), (D) and (E).

The quantity of Component (D) was about 0.48% by weight based upon the combined quantity of Components (A), (B), (C), (D) and (E).

The quantity of Component (E) was about 0.18% by weight based upon the combined quantity of Components (A), (B), (C), (D) and (E).

The resultant mixture was poured into a Mylar® tray and was observed to suddenly solidify within about 75 seconds and was demolded within about 4 minutes after catalyst addition. The maximum exotherm temperature was observed to be greater than about 120° C. The resultant solid, rigid, ¼ inch (0.64 cm) thick, essentially bubble-free casting had the following properties:

| | |
|---|---|
| Density | 1 gram/cc |
| Hardness | 20-25 Barcol (No. 934-1 tester) |

EXAMPLE 34

The following components were thoroughly blended:

Component (A) — 30 grams of Polyol A.

Component (B) — 50 grams of Polyisocyanate B.

Component (C) — 30 grams of styrene having an atmospheric boiling point of about 145.2° C.

Component (D) — 1 cc (1 gram) of tertiarybutylperoxy isopropyl carbonate (density = about 1 g/cc).

Component (E) — 1 cc (1.14 grams) of lead octoate (24% lead by wt; density = about 1.14 g/cc).

The NCO:OH equivalent ratio was about 1.12:1.

The quantity of Component (C) was about 26.75% by weight based upon the combined weight of Components (A), (B), (C), (D) and (E).

The quantity of Component (D) was about 0.89% by weight based upon the combined quantity of Components (A), (B), (C), (D) and (E).

The quantity of Component (E) was about 1.02% by weight based upon the combined quantity of Components (A), (B), (C), (D) and (E).

The resultant mixture was poured into a Mylar® tray and was observed to suddenly solidify within about 30 seconds and was demolded within about 2 minutes after catalyst addition. The resultant solid, rigid, ¼ inch (0.64 cm), essentially bubble-free casting had the following properties:

| | |
|---|---|
| Density | >1 gram/cc |
| Ultimate tensile strength | 11,889 psi (835.92 kg/cm²) |
| Elongation | 10% |
| Hardness | >40 Barcol (No. 934-1 tester |

A portion of the above prepared product was converted into powder form and about 7 grams of this powder was added to about 100 grams of a 6 weight % solution of potassium hydroxide in methanol. The solution containing the powder was refluxed at about 65° C for about 2½ hours. The methanol solution was then filtered off and a white residue was recovered and washed successively with methanol and water. After drying the powder, it was analyzed by infrared which revealed the powder to be polystyrene. The amount of powder recovered from the original 7 grams was about 2.2 grams which amounted to about 31.43%. The quantity of styrene monomer employed was about 26.75%. The recovered polystyrene powder was then subjected to analysis by gel permeation chromatography employing tetrahydrofuran as the carrier. The analysis revealed the weight average molecular weight of the polystyrene to be about 111,356. A commercially available polystyrene (Styron 666) subjected to similar analysis by gel permeation chromatography had a weight average molecular weight of about 240,991.

EXAMPLE 35

The following components were thoroughly blended:

Component (A) — 50 grams of Polyol A.

Component (B) — 50 grams of Polyisocyanate A.

Component (C) — 50 grams of styrene having an atmospheric boiling point of about 145.2° C.

Component (D) — 1 cc (1 gram) of tertiarybutyl perbenzoate (density = about 1 g/cc).

Component (E) — 1 cc (1.14 grams) of lead octoate (24% lead by weight; density = about 1.14 g/cc).

Component (F) - 40 grams of Chlorowax #40 (a chlorinated paraffin commercially available from Diamond Alkali) having an atmospheric boiling point of about >150° C.

The NCO:OH equivalent ratio was about 1:1.

The quantity of Component (C) was about 32.86% by weight based upon the combined weight of Components (A), (B), (C), (D) and (E).

The quantity of Component (D) was about 0.66% by weight based upon the combined quantity of Components (A), (B), (C), (D) and (E).

The quantity of Component (E) was about 0.75% by weight based upon the combined quantity of Components (A), (B), (C), (D) and (E).

The quantity of Component (F) was about 20.82% by weight based upon the combined quantity of Components (A), (B), (C), (D), (E) and (F).

The combined quantity of Components (C) and (F) was about 47.37% by weight based upon the combined weights of Components (A), (B), (C) and (F).

The combined equivalent weight of Components (A) and (B) was about 174.

The resultant mixture was poured into a Mylar® tray and was observed to suddenly solidify within about 60 seconds and was demolded within about 5 minutes after catalyst addition. The maximum exotherm was about 160° C. The resultant solid, rigid, essentially bubble-free casting had the following properties:

| | |
|---|---|
| Density | >1 gram/cc |
| Ultimate tensile strength | 5227 psi (367.5 kg/cm²) |
| Elongation | 12% |

COMPARATIVE EXPERIMENT L — Component (C) has boiling point <160° C, Component (A) has low equivalent weight, Component (B) is not a prepolymer and no Component (F) is present, see page 25

The following components were thoroughly blended:

Component (A) — 50 grams of Polyol A

Component (B) — 50 grams of Polyisocyanate A

Component (C) — 50 grams of styrene having an atmospheric boiling point of about 145.2° C Component (D) — 1 cc (1 gram) of tertiarybutyl perbenzoate (density = about 1 g/cc)

Component (E) — 1 cc (1.14 grams) of lead octoate (24% lead by weight) (density = about 1.14 g/cc)

Component (F) — none

The NCO:OH equivalent ratio was about 1:1.

The quantity of Component (C) was about 32.86% by weight based upon the combined weight of Components (A), (B), (C), (D) and (E).

The quantity of Component (C) was about 32.86% by weight based upon the combined weight of Components (A), (B), (C), (D) and (E).

The quantity of Component (D) was about 0.66% by weight based upon the combined quantity of Components (A), (B), (C), (D) and (E).

The quantity of Component (E) was about 0.75% by weight based upon the combined quantity of Components (A), (B), (C), (D) and (E).

The quantity of Component (F) was about 0% by weight based upon the combined quantity of Components (A), (B), (C), (D), (E) and (F).

The combined equivalent weight of Components (A) and (B) was about 174.

The resultant mixture was poured into a Mylar® tray and was observed to suddenly solidify within about 30 seconds after catalyst addition and was observed to begin to swell, distort and develop fractures. The resultant distorted, fractured and swollen casting had a density of about 0.2 gram/cc.

EXAMPLE 36

The following components were thoroughly blended.

Component (A) — 30 grams of Polyol A.

Component (B) — 30 grams of Polyisocyanate A.

Component (C) — 30 grams of styrene having an atmospheric boiling point of about 145.2° C.

Component (D) — 1 cc (1 gram) of tertiarybutyl perbenzoate (density = about 1 g/cc).

Component (E) — 1 cc (1.14 grams) of lead octoate (24% lead by wt.); density = about 1.14 g/cc).

Component (F) — 30 grams of dioctyl phthalate having a boiling point of about 231° C (5 mm Hg).

The NCO:OH equivalent ratio was about 1:1.

The quantity of Component (C) was about 32.56% by weight based upon the combined weight of Components (A), (B), (C), (D) and (E).

The quantity of Component (D) was about 1.09% by weight based upon the combined quantity of Components (A), (B), (C), (D) and (E).

The quantity of Component (E) was about 1.24% by weight based upon the combined quantity of Components (A), (B), (C), (D), (E) and (F).

The quantity of Component (F) was about 24.56% by weight based upon the combined quantity of Components (A), (B), (C), (D) and (E).

The combined quantity of Components (C) and (F) was about b 50% by weight based upon the combined weights of Components (A), (B), (C) and (F).

The combined equivalent weight of Components (A) and (B) was about 174.

The resultant mixture was poured into a Mylar® tray and was observed to suddenly solidify within about 30 seconds and was demolded within about 3 minutes after catalyst addition. The resultant solid, rigid, essentially bubble-free casting had a density of about >1 gram/cc.

EXAMPLE 37

The following components were thoroughly blended:

Component (A) — 50 grams of Polyol A

Component (B) — 50 grams of Polyisocyanate A

Component (C) — b 25 grams of styrene having an atmospheric boiling point of about 145.2° C Component (D) — 1 cc (1 gram) of tertiarybutyl perbenzoate (density = about 1 g/cc)

Component (E) — 1 cc (1.14 grams) of lead octoate (24% lead by wt.) (density = about 1.14 g/cc)

Component (F) — 25 grams of tris(dichloropropyl)-phosphate having a boiling point in excess of about 200° C at 4 mm Hg.

The NCO:OH equivalent ratio was about 1:1.

The quantity of Component (C) was about 19.6% by weight based upon the combined weight of Components (A), (B), (C), (D) and (E).

The quantity of Component (D) was about 0.79% by weight based upon the combined quantity of Components (A), (B), (C), (D) and (E).

The quantity of Component (E) was about 0.9% by weight based upon the combined quantity of Components (A), (B), (C), (D) and (E).

The quantity of Component (F) was about 16.43% by weight based upon the combined quantity of components (A), (B), (C), (D), (E) and (F).

The combined quantity of Components (C) and (F) was about 33.3% by weight based upon the combined weights of Components (A), (B), (C) and (F).

The combined equivalent weight of Components (A) and (B) was about 174.

The resultant mixture was poured into a Mylar® tray and was observed to suddenly solidify within about 30 seconds and was demolded within about 3 minutes after catalyst addition. The maximum exotherm was in excess of 100° C. The resultant solid, rigid, essentially bubble-free casting had the following properties:

| | |
|---|---|
| Density | >1 gram/cc |
| Ultimate tensile strength | 9923 psi (697.69 kg/cm²) |
| Elongation | 11% |

EXAMPLE 38

The following components were thoroughly blended:

Component (A) — 50 grams of Polyol A.

Component (B) — 50 grams of Polyisocyanate A.

Component (C) — 25 grams of styrene having an atmospheric boiling point of about 145.2° C.

Component (D) — 1 cc (1 gram) of tertiarybutyl perbenzoate (density = about 1 g/cc).

Component (E) — 1 cc (1.14 grams) of lead octoate (24% lead by weight; density = about 1.14 g/cc).

Component (F) — 25 grams of triethylbenzene having an atmospheric boiling point of about 216° C The NCO:OH equivalent ratio was about 1:1.

The quantity of Component (C) was about 19.66% by weight based upon the combined weights of Components (A), (B), (C), (D) and (E).

The quantity of Component (D) was about 0.79% by weight based upon the combined quantity of Components (A), (B), (C), (D) and (E).

The quantity of Component (E) was about 0.9% by weight based upon the combined quantity of Components (A), (B), (C), (D) and (E).

The quantity of Component (F) was about 16.43% by weight based upon the combined quantity of Components (A), (B), (C), (D), (E) and (F).

The combined quantity of Components (C) and (F) was about 33.3% by weight based upon the combined weights of Components (A), (B), (C) and (F).

The combined equivalent weight of Components (A) and (B) was about 174.

The resultant mixture was poured into a Mylar® tray and was observed to suddenly solidify within about 60 seconds and was demolded within about 4 minutes after catalyst addition. The peak exotherm temperature was in excess of 100° C. The resultant solid, rigid, essentially bubble-free casting had the following properties:

| | |
|---|---|
| Density | >1 gram/cc |
| Ultimate tensile strength | 5892 psi (414.27 kg/cm$^2$) |
| Elongation | 20% |

EXAMPLE 39

The following components were thoroughly blended:

Component (A) — 50 grams of Polyol A.

Component (B) — 50 grams of Polyisocyanate A.

Component (C) — 30 grams of styrene having an atmospheric boiling point of about 145.2° C.

Component (D) — 1 cc (1 gram) of tertiarybutyl perbenzoate (density = about 1 g/cc).

Component (E) — 1 cc (1.14 grams) of lead octoate (24% lead by wt.; density = about 1.14 g/cc).

Component (F) — 60 grams of an adduct of allyl alcohol with a 50/50 by weight mixture of ethylene oxide and propylene oxide, said adduct having a molecular weight of about 1800 and subsequently capped with a methyl group, the capped product having an atmospheric boiling point in excess of 150° C The NCO:OH equivalent ratio was about 1:1.

The quantity of Component (C) was about 22.7% by weight based upon the combined weight of Components (A), (B), (C), (D) and (E).

The quantity of Component (D) was about 0.76% by weight based upon the combined quantity of Components (A), (B), (C), (D) and (E).

The quantity of Component (E) was about 0.86% by weight based upon the combined quantity of Components (A), (B), (C), (D) and (E).

The quantity of Component (F) was about 31.23% by weight based upon the combined quantity of Components (A), (B), (C), (D), (E) and (F).

The combined quantity of Components (C) and (F) was about 47.37% by weight based upon the combined weights of Components (A), (B), (C) and (F).

The combined equivalent weight of Components (A) and (B) was about 174.

The resultant mixture was poured into a Mylar® tray and was observed to suddenly solidify within about 60 seconds and was demolded within about 5 minutes after catalyst addition. The peak exotherm temperature was about 110° C. The resultant solid, rigid, essentially bubble-free casting had a density of about >1 gram/cc.

EXAMPLE 40

The following components were thoroughly blended:

Component (A) — 50 grams of Polyol A.

Component (B) — 50 grams of Polyisocyanate A.

Component (C) — 50 grams of styrene having an atmospheric boiling point of about 145.2° C.

Component (D) — 1 cc (1 gram) of tertiarybutyl perbenzoate (density = about 1 g/cc).

Component (E) — 1 cc (1.14 grams) of lead octoate (24% lead by weight; density = about 1.14 g/cc).

Component (F) — 50 grams of ethylene carbonate having an atmospheric boiling point of about 248° C.

The NCO:OH equivalent ratio was about 1:1.

The quantity of Component (C) was about 32.86% by weight based upon the combined weight of Components (A), (B), (C), (D) and (E).

The quantity of Component (D) was about 0.66% by weight based upon the combined quantity of Components (A), (B), (C), (D) and (E).

The quantity of Component (E) was about 0.75% by weight based upon the combined quantity of Components (A), (B), (C), (D) and (E).

The quantity of Component (F) was about 24.74% by weight based upon the combined quantity of Components (A), (B), (C), (D), (E) and (F).

The combined quantity of Components (C) and (F) was about 50% by weight based upon the combined weights of Components (A), (B), (C) and (F).

The combined equivalent weight of Components (A) and (B) was about 174.

The resultant mixture was poured into a Mylar® tray and was observed to suddenly solidify within about 60 seconds and was demolded within about 5 minutes after catalyst addition. The peak exotherm temperature was observed to be in excess of 100° C. The resultant solid, rigid, essentially bubble-free casting had a density of about >1 gram/cc.

EXAMPLE 41

The following components were thoroughly blended:

Component (A) — 30 grams of Polyol A.

Component (B) — 45 grams of Polyisocyanate C.

Component (C) — 50 grams of styrene having an atmospheric boiling point of about 145.2° C.

Component (D) — 1 cc (1 gram) of tertiarybutyl perbenzoate (density = about 1 g/cc).

Component (E) — 1 cc (1.14 grams) of lead octoate (24% lead by wt.; density = about 1.14 g/cc).

Component (F) — 30 grams of triethylbenzene having an atmospheric boiling point of about 215° C.

The NCO-OH equivalent ratio was about 1:1.

The quantity of Component (C) was about 39.33% by weight based upon the combined weight of Components (A), (B), (C), (D) and (E).

The quantity of Component (D) was about 0.79% by weight based upon the combined quantity of Components (A), (B), (C), (D) and (E).

The quantity of Component (E) was about 0.9% by weight based upon the combined quantity of Components (A), (B), (C), (D) and (E).

The quantity of Component (F) was about 19.1% by weight based upon the combined quantity of components (A), (B), (C), (D) and (E).

The quantity of Component (F) was about 19.1% by weight based upon the combined quantity of Components (A), (B), (C), (D), (E) and (F).

The combined quantity of Components (C) and (F) was about 51.61% by weight based upon the combined weights of Components (A), (B), (C) and (F).

The combined equivalent weight of Components (A) and (B) was about 221.

The resultant mixture was poured into a Mylar® tray and was observed to suddenly solidify within about 90 seconds and was demolded within about 5 minutes after catalyst addition. The maximum exotherm was above 90° C. The resultant solid, rigid, essentially bubble-free casting had a density of about >1 gram/cc.

EXAMPLE 42

The following components were thoroughly blended:

Component (A) — 50 grams of Polyol A.

Component (B) — 50 grams of Polyisocyanate A.

Component (C) — 70 grams of styrene having an atmospheric boiling point of about 145.2° C.

Component (D) — 1 cc (1 gram) of tertiarybutyl perbenzoate (density = about 1 g/cc).

Component (F) — 1 cc (1.14 grams) of lead octoate (24% lead by weight; density = about 1.14 g/cc).

Component (F) — 30 grams of dipropylene glycol dibenzoate having a boiling point of about 232° C (5 mm Hg).

The NCO-OH equivalent ratio was about 1:1.

The quantity of Component (C) was about 40.66% by weight based upon the combined weight of Components (A), (B), (C), (D) and (E).

The quantity of Component (D) was about 0.58% by weight based upon the combined quantity of Components (A), (B), (C), (D) and (E).

The quantity of Component (E) was about 0.66% by weightbased upon the combined quantity of Components (A), (B), (C), (D) and (E).

The quantity of Component (F) was about 14.84% by weight based upon the combined quantity of Components (A), (B), (C), (D), (E) and (F).

The combined quantity of Components (C) and (F) was about 50% by weight based upon the combined weights of Components (A), (B), (C) and (F).

The combined equivalent weight of Components (A) and (B) was about 174.

The resultant mixture was poured into a Mylar® tray and was observed to suddenly solidify within about 60 seconds and was demolded within about 5 minutes after catalyst addition. The peak exotherm temperature was about 140° C. The resultant solid, rigid, essentially bubble-free casting had the following properties:

| | |
|---|---|
| Density | >1 gram/cc |
| Ultimate tensile strength | 3376 psi (237.37 kg/cm$^2$) |
| Elongation | 24% |

EXAMPLE 43

The following components were thoroughly blended:

Component (A) — 50 grams of Polyol A.

Component (B) — 50 grams of Polyisocyanate A.

Component (C) — 25 grams of vinyl propionate having an atmospheric boiling point of about 95° C.

Component (D) — 1 cc (1 gram) of tertiarybutyl perbenzoate (density = about 1 g/cc).

Component (E) — 1 cc (1.14 grams) of lead octoate (24% lead by wt.; density = about 1.14 g/cc).

Component (F) — 50 grams of dioctyl phthalate having a boiling point of about 231° C (5 mm Hg).

The NCO:OH equivalent ratio was about 1:1.

The quantity of Component (C) was about 19.66% by weight based upon the combined weight of Components (A), (B), (C), (D) and (E).

The quantity of Component (D) was about 0.79% by weight based upon the combined quantity of Components (A), (B), (C), (D) and (E).

The quantity of Component (E) was about 0.9% by weight based upon the combined quantity of Components (A), (B), (C), (D) and (E).

The quantity of Component (F) was about 28.23% by weight based upon the combined quantity of Components (A), (B), (C), (D), (E) and (F).

The combined quantity of Components (C) and (F) was about 42.86% by weight based upon the combined weights of components (A), (B), (C) and (F).

The combined equivalent weight of Components (A) and (B) was about 174.

The resultant mixture was poured into a Mylar® tray and was observed to suddenly solidify within about 60 seconds and was demolded within about 4 minutes after catalyst addition. The maximum exotherm temperature was about 130° C. The resultant solid, rigid, essentially bubble-free casting had the following properties:

| | |
|---|---|
| Density | >1 gram/cc |
| Ultimate tensile strength | 4230 psi (297.41 kg/cm$^2$) |
| Elongation | 12% |

EXAMPLE 44

The following components were thoroughly blended:

Component (A) — 50 grams of Polyol A.

Component (B) — 50 grams of Polyisocyanate A.

Component (C) — 25 grams of butyl acrylate having an atmospheric boiling point of about 145°-148° C.

Component (D) — 1 cc (1 gram) of tertiarybutyl perbenzoate (density = about 1 g/cc)

Component (E) — 1 cc (1.14 grams) of lead octoate (24% lead by wt.; (density = about 1.14 g/cc).

Component (F) — 25 grams of dioctyl phthalate having a boiling point of about 231° C (5 mm Hg).

The NCO:OH equivalent ratio was about 1:1.

The quantity of Component (C) was about 19.66% by weight based upon the combined weight of Components (A), (B), (C), (D) and (E).

The quantity of Component (D) was about 0.79% by weight based upon the combined quantity of Components (A), (B), (C), (D) and (E).

The quantity of Component (E) was about 0.9% by weight based upon the combined quantity of Components (A), (B), (C), (D) and (E).

The quantity of Component (F) was about 16.43% by weight based upon the combined quantity of Components (A), (B), (C), (D), (E) and (F).

The combined quantity of Components (C) and (F) was about 33.3% by weight based upon the combined weights of components (A), (B), (C) and (F).

The combined equivalent weight of Components (A) and (B) was about 174.

The resultant mixture was poured into a Mylar® tray and was observed to suddenly solidify within about 30 seconds and was demolded within about 2½ minutes after catalyst addition. The peak exotherm temperature was about 145° C. The resultant solid, rigid, essentially bubble-free casting had the following properties:

| Density | >1 gram/cc |
|---|---|
| Ultimate tensile strength | 6666 psi (468.69 kg/cm²) |
| Elongation | 14% |

EXAMPLE 45

The following components were thoroughly blended:

Component (A) — 26 grams of Polyol C.

Component (B) — 45 grams of Polyisocyanate C.

Component (C) — 30 grams of vinyl propionate having an atmospheric boiling point of about 95° C.

Component (D) — 1 cc (1 gram) of tertiarybutyl perbenzoate (density = about 1 g/cc).

Component (E) — None (Component (A) was an amine initiated polyol).

Component (F) — 30 grams of Chlorowax ® 40 having an atmospheric boiling point in excess of 150° C.

The NCO:OH equivalent ratio was about 0.92:1.

The quantity of Component (C) was about 29.41% by weight based upon the combined weight of Components (A), (B), (C), (D) and (E).

The quantity of Component (D) was about 0.98% by weight based upon the combined quantity of Components (A), (B), (C), (D) and (E).

The quantity of Component (E) was about 0% by weight based upon the combined quantity of Components (A), (B), (C), (D) and (E).

The quantity of Component (F) was about 22.73% by weight based upon the combined quantity of Components (A), (B), (C), (D), (E) and (F).

The combined quantity of Components (C) and (F) was about 22.9% by weight based upon the combined weights of Components (A), (B), (C) and (F).

The combined equivalent weight of Components (A) and (B) was about 204.

The resultant mixture was poured into a Mylar ® tray and was observed to suddenly solidify within about 60 seconds and was demolded within about 4 minutes after polyisocyanate addition. The peak exotherm temperature was greater than about 80° C. The resultant solid, rigid, essentially bubble-free casting had the following properties:

| Density | >1 gram/cc |
|---|---|
| Ultimate tensile strength | 3662 psi (257,44 kg/cm²) |
| Elongation | 17% |

COMPARATIVE EXPERIMENT M: (Boiling point of Component (C) too low)

The following components were thoroughly blended:

Component (A) — 26 grams of Polyol C.

Component (B) — 45 grams of Polyisocyanate C.

Component (C) — 30 grams of vinyl acetate having an atmospheric boiling point of about 73° C.

Component (D) — 1 cc (1 gram) of tertiarybutyl perbenzoate (density = 1 g/cc)

Component (E) — None (Component (A) was an amine initiated polyol).

Component (F) — 30 grams of Chlorowax ® 40 having an atmospheric boiling point in excess of 150° C.

the NCO:OH equivalent ratio was about 0.92:1.

The quantity of Component (C) was about 29.41% by weight based upon the combined weight of Components (A), (B), (C), (D) and (E).

The quantity of Component (D) was about 0.98% by weight based upon the combined quantity of Components (A), (B), (C), (D) and (E).

The quantity of Component (E) was about 0% by weight based upon the combined quantity of Components (A), (B), (C), (D) and (E).

The quantity of Component (F) was about 22.73% by weight based upon the combined quantity of Components (A), (B), (C), (D), (E) and (F).

The combined quantity of Components (C) and (F) was about 22.9% by weight based upon the combined weights of Components (A), (B), (C) and (F).

The combined equivalent weight of Components (A) and (B) was about 204.

The resultant mixture was poured into a Mylar ® tray and was observed to suddenly solidify within about 3 minutes after polyisocyanate addition and began to swell, distort and form large bubbles. The resultant swollen, distorted casting having irregular shaped bubbles had a density of about 0.4 gram/cc.

EXAMPLE 46

The following components were thoroughly blended:

Component (A) — 50 grams of Polyol A.

Component (B) — 50 grams of Polyisocyanate A.

Component (C) — 50 grams of styrene having an atmospheric boiling point of about 145.2° C.

Component (D) — 1 cc (1 gram) of tertiarybutyl perbenzoate (density = about 1 g/cc).

Component (E) — 1 cc (1.14 grams) of lead octoate (24% lead by wt.; density = about 1.14 g/cc).

Component (F) — 50 grams of polypropylene powder having a surface area of about 0.3 m²/gram and a particle size such that the powder will pass through a ¼ inch square opening.

The NCO:OH equivalent ratio was about 1:1.

The quantity of Component (C) was about 32.86% by weight based upon the combined weight of Components (A), (B), (C), (D) and (E).

The quantity of Component (D) was about 0.66% by weight based upon the combined quantity of Components (A), (B), (C), (D) and (E).

The quantity of Component (E) was about 0.75% by weight based upon the combined quantity of Components (A), (B), (C), (D), and (E).

The quantity of Component (F) was about 24.74% by weight based upon the combined quantity of Components (A), (B), (C), (D), (E) and (F).

The combined quantity of Components (C) and (F) was about 50% by weight based upon the combined weights of Components (A), (B), (C) and (F).

The combined equivalent weight of Components (A) and (B) was about 174.

The resultant mixture was poured into a Mylar ® tray and was observed to suddenly solidify within about 60 seconds and was demolded within about 9 minutes after catalyst addition. The peak exotherm temperature was in excess of 80° C. The resultant solid, rigid, essentially bubble-free casting had the following properties:

| Density | >1 gram/cc |
|---|---|
| Ultimate tensile strength | 5432 psi (381.87 kg/cm²) |
| Elongation | 8% |
| Hardness | 81-100 Barcol (No. 935 tester) |

EXAMPLE 47

The following components were thoroughly blended:

Component (A) — 40 grams of Polyol A
Component (B) — 40 grams of Polyisocyanate A
Component (C) — 40 grams of styrene having an atmospheric boiling point of about 145.2° C
Component (D) — 1 cc (1 gram) of tertiarybutyl perbenzoate (density = about 1 g/cc)
Component (E) — 1 cc (1.14 grams) of lead octoate (24% lead by weight) (density = about 1.14 g/cc)
Component (F) — 40 grams of silicon metal powder having a surface area of about 0.6 $m^2/g$ and an average particle size such that it passes through a 200 mesh (US standard) screen.

The NCO:OH equivalent ratio was about 1:1.

The quantity of Component (C) was about 32.75% by weight based upon the combined weight of Components (A), (B), (C), (D) and (E).

The quantity of Component (D) was about 0.82% by weight based upon the combined quantity of Components (A), (B), (C), (D) and (E).

The quantity of Component (E) was about 0.93% by weight based upon the combined quantity of Components (A), (B), (C), (D) and (E).

The quantity of Component (F) was about 24.67% by weight based upon the combined quantity of Components (A), (B), (C), (D), (E) and (F).

The combined quantity of Components (C) and (F) was about 50% by weight based upon the combined weights of Components (A), (B), (C) and (F).

The combined equivalent weight of Components (A) and (B) was about 174.

The resultant mixture was poured into a Mylar® tray and was observed to suddenly solidify within about 60 seconds and was demolded within about 10 minutes after catalyst addition. The peak exotherm temperature was in excess of 80° C. The resultant solid, rigid, essentially bubble-free casting had the following properties:

| | |
|---|---|
| Density | >1 gram/cc |
| Hardness | 40 Barcol (No. 934-1 tester) |

EXAMPLE 48

The following components were thoroughly blended:
Component (A) — 40 grams of Polyol A
Component (B) — 40 grams of Polyisocyanate A
Component (C) — 40 grams of styrene having an atmospheric boiling point of about 145.2° C
Component (D) — 1 cc (1 gram) of tertiarybutyl perbenzoate (density = about 1 g/cc)
Component (E) — 1 cc (1.14 grams) of lead octoate (24% lead by weight) (density = about 1.14 g/cc)
Component (F) — 40 grams of hydrated alumina powder ($Al_2O_3.3H_2O$) having a surface area of about <0.3 $m^2/g$ and an average particle size such that 75 weight percent passes through a 325 mesh (US standard) screen.

The NCO:OH equivalent ratio was about 1:1.

The quantity of Component (C) was about 32.75% by weight based upon the combined weight of Components (A), (B), (C), (D) and (E).

The quantity of Component (D) was about 0.82% by weight based upon the combined quantity of Components (A), (B), (C), (D) and (E).

The quantity of Component (E) was about 0.93% by weight based upon the combined quantity of Components (A), (B), (C), (D) and (E).

The quantity of Component (F) was about 24.67% by weight based upon the combined quantity of Components (A), (B), (C), (D), (E) and (F).

The combined quantity of Components (C) and (F) was about 50% by weight based upon the combined weights of Components (A), (B), (C) and (F).

The combined equivalent weight of Components (A) and (B) was about 174.

The resultant mixture was poured into a Mylar® tray and was observed to suddenly solidify within about 60 seconds and was demolded within about 10 minutes after catalyst addition. The resultant solid, rigid, essentially bubble-free casting had the following properties:

| | |
|---|---|
| Density | 1 gram/cc |
| Hardness | 25-35 Barcol (No. 943-1 tester) |

EXAMPLE 49

The following components were thoroughly blended:
Component (A) — 50 grams of Polyol A.
Component (B) — 50 grams of Polyisocyanate A.
Component (C) — 50 grams of styrene having an atmospheric boiling point of about 145.2° C.
Component (D) — 0.4 cc (0.4 gram) of tertiarybutylperoxy isopropyl carbonate (density = about 1 g/cc)
Component (E) — 0.2 cc (0.23 gram) of lead octoate (24% lead by weight; density = about 1.14 g/cc).
Component (F) — 30 grams of dioctyl phthalate having a boiling point of about 231° C (5 mm Hg).

The NCO:OH equivalent ratio was about 1:1.

The quantity of Component (C) was about 33.19% by weight based upon the combined weight of Components (A), (B), (C), (D) and (E).

The quantity of Component (D) was about 0.27% by weight based upon the combined quantity of Components (A), (B), (C), (D) and (E).

The quantity of Component (E) was about 0.15% by weight based upon the combined quantity of Components (A), (B), (C), (D) and (E).

The quantity of Component (F) was about 16.61% by weight based upon the combined quantity of Components (A), (B), (C), (D) (E) and (F).

The combined quantity of Components (C) and (F) was about 44.4% by weight based upon the combined weights of Components (A), (B), (C) and (F).

The combined equivalent weight of Components (A) and (B) was about 174.

The resultant mixture was poured into a Mylar® tray and was observed to suddenly solidify within about 35 seconds and was demolded within about 5 minutes after catalyst addition. The resultant solid, rigid, essentially bubble-free casting had the following properties:

| | |
|---|---|
| Density | >1 gram/cc |
| Ultimate tensile strength | 6623 psi (465.66 $kg/cm^2$) |
| Elongation | 8% |

EXAMPLE 50

The following components were thoroughly blended:
Component (A) — 30 grams of Polyol A.
Component (B) — 46 grams of Polyisocyanate C.
Component (C) — 30 grams of styrene having an atmospheric boiling point of about 145.2° C.
Component (D) — 0.5 cc (0.5 grams) of tertiarybutyl perbenzoate (density = about 1 g/cc).

Component (E) — 4 cc (4.16 grams) of a 33% solution of triethylenediamine in dipropylene glycol (density = about 1.04 g/cc).

The NCO:OH equivalent ratio was about 1:1.

The quantity of Component (C) was about 27.11% by weight based upon the combined weight of Components (A), (B), (C), (D) and (E).

The quantity of Component (D) was about 0.45% by weight based upon the combined quantity of Components (A), (B), (C), (D) and (E).

The quantity of Components (E) was about 3.76% by weight based upon the combined quantity of Components (A), (B), (C), (D) and (E).

The combined equivalent weight of Components (A) and (B) was about 221.

The resultant mixture was poured into a Mylar® tray and was observed to suddenly solidify within about 60 seconds and was demolded within about 3 minutes after catalyst addition. The peak exotherm was in excess of 110° C. The resultant solid, rigid, 3/16 inch thick, essentially bubble-free casting had the following properties:

| | |
|---|---|
| Density | >1 gram/cc |
| Hardness | 25 Barcol (No. 934-1 tester |

EXAMPLE 51

The following components were thoroughly blended:

Component (A) — 50 grams of Polyol A.

Component (B) — 75 grams of Polyisocyanate B.

Component (C) — 50 grams of styrene having an atmospheric boiling point of about 145.2° C.

Component (D) — 1 cc (1 gram) of tertiarybutyl perbenzoate (density = about 1 g/cc).

Component (E) — 3 cc (2.67 grams) of a 70% by weight solution of bis(2-dimethyl aminoethyl)ether (density = about 0.89 g/cc)

The NCO:OH equivalent ratio was about 1.1.

The quantity of Component (C) was about 27.98% by weight based upon the combined weight of Components (A), (B), (C), (D) and (E).

The quantity of Component (D) was about 0.56% by weight based upon the combined quantity of Components (A), (B), (C), (D) and (E).

The quantity of Component (E) was about 1.49% by weight based upon the combined quantity of Components (A), (B), (C), (D) and (E).

The combined equivalent weight of Components (A) and (B) was about 218.

The resultant mixture was poured into a Mylar® tray and was observed to suddenly solidify within about 5 minutes and was demolded within about 14 minutes after catalyst addition. The maximum exotherm temperature was about 78° C. The resultant solid, rigid, essentially bubble-free sheet had the following properties:

| | |
|---|---|
| Density | >1 gram/cc |
| Hardness | 82 Barcol (No. 935 tester) |
| | <1 Barcol (No. 934-1 tester) |

EXAMPLE 52

The following components were thoroughly blended:

Component (A) — 50 grams of Polyol A.

Component (B) — 75 grams of Polyisocyanate B.

Component (C) — 50 grams of styrene having an atmospheric boiling point of about 145.2° C.

Component (D) — 1 cc (1 gram) of tertiarybutyl perbenzoate (density = about 1 g/cc).

Component (E) — 4 cc (3.56 grams) of a 70% by weight solution of bis(2-dimethylaminoethyl)ether (density = about 0.89 g/cc).

The NCO:OH equivalent ratio was about 1:1.

The quantity of Component (C) was about 27.85% by weight based upon the combined weight of Components (A), (B), (C), (D) and (E).

The quantity of Component (D) was about 0.56% by weight based upon the combined quantity of Components (A), (B), (C), (D) and (E).

The quantity of Component (E) was about 1.98% by weight based upon the combined quantity of Components (A), (B), (C), (D) and (E).

The combined equivalent weight of Components (A) and (B) was about 218.

The resultant mixture was poured into a Mylar® tray and was observed to suddenly solidify within about 3 minutes and was demolded within about 10 minutes after catalyst addition. The peak exotherm temperature was in excess of about 120° C. The resultant solid, rigid, essentially bubble-free cast sheet had the following properties:

| | |
|---|---|
| Density | >1 gram/cc |
| Hardness | >95 Barcol (No. 935 tester) |
| | 20–30 Barcol (No. 934-1 tester) |

EXAMPLE 53

The following components were thoroughly blended:

Component (A) — 50 grams of Polyol A.

Component (B) — 75 grams of Polyisocyanate B.

Component (C) — 50 grams of styrene having an atmospheric boiling point of about 145.2° C.

Component (D) — 1 cc (1 gram) of tertiarybutyl perbenzoate (density = about 1 g/cc).

Component (E) — 5 grams of triethylamine.

The NCO:OH equivalent ratio was about 1:1.

The quantity of Component (C) was about 27.62% by weight based upon the combined weight of Components (A), (B), (C), (D) and (E).

The quantity of Component (D) was about 0.55% by weight based upon the combined quantity of Components (A), (B), (C), (D) and (E).

The quantity of Component (E) was about 2.76% by weight based upon the combined quantity of Components (A), (B), (C), (D) and (E).

The combined equivalent weight of Components (A) and (B) was about 218.

The resultant mixture was poured into a Mylar® tray and was observed to suddenly solidify within about 8 minutes and was demolded within about 13 minutes after catalyst addition. The maximum exotherm was observed to be about 80° C. The resultant solid, rigid, essentially bubble-free casting had the following properties:

| | |
|---|---|
| Density | >1 gram/cc |
| Hardness | 80 Barcol (No. 935 tester) |

COMPARATIVE EXPERIMENT N — (Inoperability of primary amine as catalyst for urethane formation)

The following components were thoroughly blended:

Component (A) — 50 grams of Polyol A
Component (B) — 75 grams of Polyisocyanate B
Component (C) — 50 grams of styrene having an atmospheric boiling point of about 145.2° C.
Component (D) — 1 cc (1 gram) of tertiarybutyl perbenzoate (density = about 1 g/cc)
Component (E) — 4 grams of 1,1,4,4-tetramethyl-1,4-butanediamine.

The NCO:OH equivalent ratio was about 1:1.

The quantity of Component (C) was about 21.74% by weight based upon the combined weight of Components (A), (B), (C), (D) and (E).

The quantity of Component (D) was about 0.43% by weight based upon the combined quantity of Components (A), (B) (C), (D) and (E).

The quantity of Component (E) was about 1.74% by weight based upon the combined quantity of Components (A), (B), (C), (D) and (E).

The combined equivalent weight of Components (A) and (B) was about 218.

The resultant mixture was poured into a Mylar® tray and was observed to still be a liquid 15 minutes after catalyst addition. About 24 hours later, the resultant product was observed to be a gross irregular gas-cell filled soft casting having the following properties:

| | |
|---|---|
| Density | about 0.8 grams/cc |
| Hardness | >1 Barcol (No. 935 tester) |

COMPARATIVE EXPERIMENT O: (Tertiary amine with an aromatic nucleus attached to the nitrogen atom is shown to be ineffective as a catalyst)

The following components were thoroughly blended:
Component (A) — 50 grams of Polyol A.
Component (B) — 75 grams of Polyisocyanate B.
Component (C) — 50 grams of styrene having an atmospheric boiling point of about 145.2° C.
Component (D) — 1 (1 gram) of tertiarybutyl perbenzoate (density = about 1 g/cc).
Component (E) — 4 cc (3.8 grams) of N,N-dimethylaniline (density = about 0.95).

The NCO:OH equivalent ratio was about 1:1.

The quantity of Component (C) was about 27.81% by weight based upon the combined weight of Components (A), (B), (C), (D) and (E).

The quantity of Component (D) was about 0.56% by weight based upon the combined quantity of Components (A), (B), (C), (D) and (E).

The quantity of Component (E) was about 2.11% by weight based upon the combined quantity of Components (A), (B), (C), (D) and (E).

The combined equivalent weight of Components (A) and (B) was about 218.

The resultant mixture was poured into a Mylar tray and was unable to be demolded within about 15 minutes after catalyst addition. The maximum exotherm was observed to be less than 50° C. About 24 hours later, the resultant product was a soft solid having gross irregular gas cells having the following properties:

| | |
|---|---|
| Density | >0.9 gram/cc |

COMPARATIVE EXPERIMENT P: (Inoperability of a secondary amine)

The following components were thoroughly blended:
Component (A) — 50 grams of Polyol A.
Component (B) — 75 grams of Polyisocyanate B.
Component (C) — 50 grams of styrene having an atmospheric boiling point of about 145.2° C.
Component (D) — 1 cc (1 gram) of tertiarybutyl perbenzoate (density = about 1 g/cc).
Component (E) — 5 grams of morpholine.

The NCO:OH equivalent ratio was about 1:1.

The quantity of Component (C) was about 27.62% by weight based upon the combined weight of Components (A), (B), (C), (D) and (E).

The quantity of Component (D) was about 0.55% by weight based upon the combined quantity of Components (A), (B), (C), (D) and (E).

The quantity of Component (E) was about 2.76% by weight based upon the combined quantity of Components (A), (B), (C), (D) and (E).

The combined equivalent weight of Components (A) and (B) was about 218.

The resultant mixture was poured into a Mylar® tray and was observed to still be a liquid 24 hours after catalyst addition. The maximum exotherm was observed to be 42° C. The resultant irregular, gas-cell filled product had the following properties:

| | |
|---|---|
| Density | 0.9 gram/cc |

EXAMPLE 54

The following components were thoroughly blended:
Component (A) — 50 grams of Polyol A.
Component (B) — 50 grams of Polyisocyanate A.
Component (C) — 50 grams of styrene having an atmospheric boiling point of about 145.2° C.
Component (D) — 1 cc (1 gram) of tertiarybutyl perbenzoate (density = about 1 g/cc).
Component (E) — 3 cc (3.12 grams) of a 33% solution of triethylene diamine in dipropylene glycol (density = about 1.04 g/cc).

The NCO:OH equivalent ratio was about 1:1.

The quantity of Component (C) was about 32.44% by weight based upon the combined weight of Components (A), (B), (C), (D) and (E).

The quantity of Component (D) was about 0.65% by weight based upon the combined quantity of Components (A), (B), (C), (D) and (E).

The quantity of Component (E) was about 2.02% by weight based upon the combined quantity of Components (A), (B), (C), (D) and (E).

The combined equivalent weight of Components (A) and (B) was about 174.

The resultant mixture was poured into a Mylar® tray and was observed to suddenly solidify within about 60 seconds and was demolded within about 5 minutes after catalyst addition. The maximum exotherm was observed to be about 140° C. The resultant solid, rigid, transparent, essentially bubble-free, ¼ inch thick casting had the following properties:

| | |
|---|---|
| Density | >1 gram/cc |
| Hardness | 32 Barcol (No. 934-1 tester) |

EXAMPLE 55

The following components were thoroughly blended:
Component (A) — 50 grams of Polyol A.
Component (B) — 50 grams of Polyisocyanate A.

Component (C) — 50 grams of styrene having an atmospheric boiling point of about 145.2° C.

Component (D) — 1 cc (1 gram) of tertiarybutyl perbenzoate (density = about 1 g/cc).

Component (E) — 5 grams of N,N-dimethylaminoethanol.

The NCO:OH equivalent ratio was about 1:1.

The quantity of Component (C) was about 32.05% by weight based upon the combined weight of Components (A), (B), (C), (D) and (E).

The quantity of Component (D) was about 0.64% by weight based upon the combined quantity of Components (A), (B), (C), (D) and (E).

The quantity of Component (E) was about 3.21% by weight based upon the combined quantity of Components (A), (B), (C), (D) and (E).

The combined equivalent weight of Components (A) and (B) was about 174.

The resultant mixture was poured into a Mylar® tray and was observed to suddenly solidify within about 4 minutes and was demolded within about 12 minutes after catalyst addition. The maximum exotherm was observed to be about 140° C. The resultant solid, rigid, essentially bubble-free casting had the following properties:

| Density | >1 gram/cc |
|---|---|

EXAMPLE 56

The following components were thoroughly blended:

Component (A) — 50 grams of Polyol A.

Component (B) — 50 grams of Polyisocyanate A.

Component (C) — 50 grams of styrene having an atmospheric boiling point of about 145.2° C.

Component (D) — 1 cc (1 gram) of tertiarybutyl perbenzoate (density = about 1 g/cc).

Component (E) — 4 grams of N-ethylpiperidine.

The NCO:OH equivalent ratio was about 1:1.

The quantity of Component (C) was about 32.26% by weight based upon the combined weight of Components (A), (B), (C), (D) and (E).

The quantity of Component (D) was about 0.65% by weight based upon the combined quantity of Components (A), (B), (C), (D) and (E).

The quantity of Component (E) was about 2.58% by weight based upon the combined quantity of Components (A), (B), (C), (D) and (E).

The combined equivalent weight of Components (A) and (B) was about 174.

The resultant mixture was poured into a Mylar® tray and was observed to suddenly solidify within about 6 minutes and was demolded within about 12 minutes after catalyst addition. The maximum exotherm was about 85° C. The resultant solid, rigid, essentially bubble-free casting had the following properties:

| Density | >1 gram/cc |
|---|---|

EXAMPLE 57

The following components were thoroughly blended:

Component (A) — 50 grams of Polyol A.

Component (B) — 50 grams of Polyisocyanate A.

Component (C) — 50 grams of styrene having an atmospheric boiling point of about 145.2° C.

Component (D) — 1 cc (1 gram) of tertiarybutyl perbenzoate (density = about 1 g/cc).

Component (E) — 15 cc (13.74 grams) of N-ethylmorpholine (density = about 0.916 g/cc).

The NCO:OH equivalent ratio was about 1:1.

The quantity of Component (C) was about 30.35% by weight based upon the combined weight of Components (A), (B), (C), (D) and (E).

The quantity of Component (E) was about 8.34% by weight based upon the combined quantity of Components (A), (B), (C), (D) and (E).

The combined equivalent weight of Components (A) and (B) was about 174.

The resultant mixture was poured into a Mylar® tray and was observed to suddenly solidify within about 10 minutes and was demolded within about 15 minutes after catalyst addition. The maximum exotherm was about 81° C. The resultant solid, essentially bubble-free casting had the following properties:

| Density | >1 gram/cc |
|---|---|

EXAMPLE 58

The following components were thoroughly blended:

Component (A) — 50 grams of Polyol A.

Component (B) — 50 grams of Polyisocyanate A.

Component (C) — 50 grams of styrene having an atmospheric boiling point of about 145.2° C.

Component (D) — 1 cc (1 gram) of tertiarybutyl perbenzoate (density = about 1 g/cc).

Component (E) — 10 cc (9.21 grams) of N-methylmorpholine (density = about 0.921 g/cc).

The NCO:OH equivalent ratio was about 1:1.

The quantity of Component (C) was about 31.21% by weight based upon the combined weight of Components (A), (B), (C), (D) and (E).

The quantity of Component (D) was about 0.62% by weight based upon the combined quantity of Components (A), (B), (C), (D) and (E).

The quantity of Component (E) was about 5.75% by weight based upon the combined quantity of Components (A), (B), (C), (D) and (E).

The combined equivalent weight of Components (A) and (B) was about 184.

The resultant mixture was poured into a Mylar® tray and was observed to suddenly solidify within about 10 minutes and was demolded within about 15 minutes after catalyst addition. The maximum exotherm was about 85° C. The resultant solid, rigid, essentially bubble-free casting had a density of >1 gram/cc.

EXAMPLE 59

The following components were thoroughly blended:

Component (A) — 43 grams of Polyol I.

Component (B) — 50 grams of Polyisocyanate A.

Component (C) — 50 grams of styrene having an atmospheric boiling point of about 145.2° C.

Component (D) — 1 cc (1 gram) of tertiarybutyl perbenzoate (density = about 1 g/cc).

Component (E) — 10 cc (9.16 grams) of N-ethylmorpholine (density = about 0.916 g/cc).

The NCO:OH equivalent ratio was about 1:1.

The quantity of Component (C) was about 32.65% by weight based upon the combined weight of Components (A), (B), (C), (D) and (E).

The quantity of Component (D) was about 0.65% by weight based upon the combined quantity of Components (A), (B), (C), (D) and (E).

The quantity of Component (E) was about 5.98% by weight based upon the combined quantity of Components (A), (B), (C), (D) and (E).

The combined equivalent weight of Components (A) and (B) was about 163.

The resultant mixture was poured into a Mylar® tray and was observed to suddenly solidify within about 2 minutes and was demolded within about 10 minutes after catalyst addition. The maximum exotherm exceeded 100° C. The resultant solid, rigid, essentially bubble-free casting had the following properties:

| | |
|---|---|
| Density | >1 gram/cc |
| Hardness | 30-60 Barcol (No. 935 tester) |

EXAMPLE 60

The following components were thoroughly blended:

Component (A) — 50 grams of Polyol A.

Component (B) — 50 grams of Polyisocyanate A.

Component (C) — 50 grams of styrene having an atmospheric boiling point of about 145.2° C.

Component (D) — 1 cc (1 gram) of tertiarybutyl perbenzoate (density = about 1 g/cc)

Component (E) — 6 cc (5.4 grams) of 1,3-bis(dimethylamino)-2-propanol (density = about 0.9 g/cc).

The NCO:OH equivalent ratio was about 1:1.

The quantity of Component (C) was about 31.97% by weight based upon the combined weight of Components (A), (B), (C), (D) and (E).

The quantity of Component (D) was about 0.64% by weight based upon the combined quantity of Components (A), (B), (C), (D) and (E).

The quantity of Component (E) was about 3.45% by weight based upon the combined quantity of Components (A), (B), (C), (D) and (E).

The combined equivalent weight of Components (A) and (B) was about 174.

The resultant mixture was poured into a Mylar® tray and was observed to suddenly solidify within about 10 minutes and was demolded within about 14 minutes after catalyst addition. The maximum exotherm was about 100° C. The resultant solid, transparent, essentially bubble-free casting had the following properties:

| | |
|---|---|
| Density | >1 gram/cc |
| Hardness | 40 Barcol (No. 935 tester) |

EXAMPLE 61

The following components were thoroughly blended:

Component (A) — 50 grams of Polyol J.

Component (B) — 50 grams of Polyisocyanate C.

Component (C) — 50 grams of styrene having an atmospheric boiling point of about 145.2° C.

Component (D) — 1 cc (1 gram) of tertiarybutyl perbenzoate (density = about 1 g/cc).

Component (E) — 1 cc (1.04 grams) of a 33% by weight solution of triethylenediamine in dipropylene glycol (density = about 1.04 g/cc).

The NCO:OH equivalent ratio was about 1.12:1.

The quantity of Component (C) was about 32.89% by weight based upon the combined weight of Components (A), (B), (C), (D) and (E).

The quantity of Component (D) was about 0.66% by weight based upon the combined quantity of Components (A), (B), (C), (D) and (E).

The quantity of Component (E) was about 0.68% by weight based upon the combined quantity of Components (A), (B), (C), (D) and (E).

The combined equivalent weight of Components (A) and (B) was about 284.

The resultant mixture was poured into a Mylar® tray and was observed to suddenly solidify within about 2 minutes and was demolded within about 15 minutes after catalyst addition. The maximum exotherm was about 85° C. The resultant solid, essentially bubble-free casting had the following properties:

| | |
|---|---|
| Density | >1 gram/cc |

COMPARATIVE EXPERIMENT Q: (Inoperability of Aliphatic Polyisocyanate when Amine Catalyst is Employed as the Catalyst for Urethane Formation)

The following components were thoroughly blended:

Component (A) — 50 grams of Polyol A.

Component (B) — 75 grams of Polyisocyanate I.

Component (C) — 50 grams of styrene having an atmospheric boiling point of about 145.2° C.

Component (D) — 1 cc (1 gram) of tertiarybutyl perbenzoate (density = about 1 g/cc).

Component (E) — 4 grams of a 33% by weight solution of triethylenediamine in dipropylene glycol.

The NCO:OH equivalent ratio was about 1:1.

The quantity of Component (C) was about 27.78% by weight based upon the combined weight of Components (A), (B), (C), (D) and (E).

The quantity of Component (D) was about 0.56% by weight based upon the combined quantity of Components (A), (B), (C), (D) and (E).

The quantity of Component (E) was about 2.22% by weight based upon the combined quantity of Components (A), (B), (C), (D) and (E).

The combined equivalent weight of Components (A) and (B) was about 219.

The resultant mixture was poured into a Mylar® tray and was observed to be still a pourable liquid within about 40 minutes after catalyst addition. The maximum exotherm was about 30° C. After several days, the resultant product was an extremely weak, brittle foamed mass having a density of <0.9 gram/cc.

EXAMPLE 62

The following components were thoroughly blended:

Component (A) — 30 grams of Polyol A.

Component (B) — 30 grams of Polyisocyanate A.

Component (C) — 30 grams of N,N-dimethylaminoethyl methacrylate having a boiling point of about 62°-65° C (6 mm Hg).

Component (D) — 0.5 cc (0.5 gram) of tertiarybutyl perbenzoate (density = about 1 g/cc).

The NCO:OH equivalent ratio was about 1:1.

The quantity of Component (C) was about 33.15% by weight based upon the combined weight of Components (A), (B), (C), and (D).

The quantity of Component (D) was about 0.55% by weight based upon the combined quantity of Components (A), (B), (C), and (D).

The combined equivalent weight of Components (A) and (B) was about 174.

The resultant mixture was poured into a Mylar® tray and was observed to suddenly solidify within about 30 seconds and was demolded within about 10 minutes after addition of the amine containing monomer. The resultant, essentially bubble-free casting had the following properties:

| | |
|---|---|
| Density | 1 gram/cc |
| Ultimate tensile strength | 7222 psi (507.71 kg/cm$^2$) |
| Elongation | 11% |
| Hardness | 30 Barcol (No. 934-1 tester) |

EXAMPLE 63

The following components were thoroughly blended:
Component (A) — 50 grams of Polyol A
Component (B) — 50 grams of Polyisocyanate A
Component (C) — 50 grams of N-tertiarybutylaminoethyl methacrylate having an atmospheric boiling point in excess of 150° C.
Component (D) — 1 cc (1 gram) of tertiarybutyl perbenzoate (density = about 1 g/cc)

The NCO:OH equivalent ratio was about 1:1.

The quantity of Component (C) was about 33.11% by weight based upon the combined weight of Components (A), (B), (C) and (D).

The quantity of Component (D) was about 0.66% by weight based upon the combined quantity of Components (A), (B) (C) and (D).

The combined equivalent weight of Components (A) and (B) was about 174.

The resultant mixture was poured into a Mylar® tray and was observed to suddenly solidify within about 4 minutes and was demolded within about 9 minutes after polyisocyanate addition. The resultant transparent, essentially bubble-free casting had the following properties:

| | |
|---|---|
| Density | >1 gram/cc |
| Hardness | 35-40 Barcol (No. 934-1 tester) |

EXAMPLE 64

The following components were thoroughly blended:
Component (A) — 50 grams of Polyol A
Component (B) — 50 grams of Polyisocyanate A
Component (C) — 20 grams of styrene having an atmospheric boiling point of about 145.2° C. 30 grams of N,N-dimethylaminoethyl methacrylate having a boiling point of about 62°-65° C (6 mm Hg).
Component (D) — 1 cc (1 gram) of tertiarybutyl perbenzoate (density = about 1 g/cc)

The NCO:OH equivalent ratio was about 1:1.

The quantity of Component (C) was about 33.11% by weight based upon the combined weight of Components (A), (B), (C) and (D).

The quantity of Component (D) was about 0.66% by weight based upon the combined quantity of Components (A), (B), (C) and (D).

The combined equivalent weight of Components (A) and (B) was about 174.

The resultant mixture was poured into a Mylar® tray and was observed to suddenly solidify within about 60 seconds and was demolded within about 4 minutes after amino vinyl compound addition. The resultant essentially bubble-free casting had the following properties:

| | |
|---|---|
| Density | 1 gram/cc |
| Ultimate tensile strength | 8587 psi (603.67 kg/cm$^2$) |
| Elongation | 14% |
| Hardness | 22 Barcol (No. 934-1 tester) |

EXAMPLE 65

The following components were thoroughly blended:
Component (A) — 50 grams of Polyol A
Component (B) — 50 grams of Polyisocyanate A
Component (C) — 40 grams of styrene having an atmospheric boiling point of about 145.2° C. 10 grams of N,N-dimethylaminoethyl methacrylate having a boiling point of about 62°-65° C (6 mm Hg).
Component (D) — 1 cc (1 gram) of tertiarybutyl perbenzoate (density = about 1 g/cc)

The NCO:OH equivalent ratio was about 1:1.

The quantity of Component (C) was about 33.11% by weight based upon the combined weight of Components (A), (B), (C) and (D).

The quantity of Component (D) was about 0.66% by weight based upon the combined quantity of Components (A), (B), (C) and (D).

The combined equivalent weight of Components (A) and (B) was about 174.

The resultant mixture was poured into a Mylar® tray and was observed to suddenly solidify within about 4 minutes and was demolded within about 14 minutes after polyisocyanate addition. The maximum exotherm was about 110° C. The resultant solid, 5/16-inch thick, essentially bubble-free casting had the following properties:

| | |
|---|---|
| Density | >1 gram/cc |
| Hardness | 35 Barcol (No. 934-1 tester) |

COMPARATIVE EXPERIMENT R - (Insufficient quantity of Amino Vinyl Monomer to Act as a Catalyst for Urethane Formation)

The following components were thoroughly blended:
Component (A) — 50 grams of Polyol A
Component (B) — 50 grams of Polyisocyanate A
Component (C) — 45 grams of styrene having an atmospheric boiling point of about 145.2° C. 5 grams of N,N-dimethylaminoethyl methacrylate having a boiling point of about 62°-65° C (6 mm Hg).
Component (D) — 1 cc (1 gram) of tertiarybutyl perbenzoate The NCO:OH equivalent ratio was about 1:1.

The quantity of Component (C) was about 33.11% by weight based upon the combined weight of Components (A), (B), (C) and (D).

The quantity of Component (D) was about 0.66% by weight based upon the combined quantity of Components (A), (B), (C) and (D).

The combined equivalent weight of Components (A) and (B) was about 174.

The resultant mixture was poured into a Mylar® tray and was observed to still be a pourable liquid after about 25 minutes after polyisocyanate addition. The maximum exotherm temperature was observed to be about 74° C.

EXAMPLE 66

The following components were thoroughly blended:

Component (A) — 40 grams of Polyol K

Component (B) — 50 grams of Polyisocyanate C

Component (C) — 20 grams of styrene having an atmospheric boiling point of about 145.2° C. 30 grams of N-tertiarybutylaminoethyl methacrylate having an atmospheric boiling point in excess of 150° C Component (D) — 1 cc (1 gram) of tertiarybutyl perbenzoate (density = about 1 g/cc)

The NCO:OH equivalent ratio was about 0.93:1.

The quantity of Component (C) was about 35.46% by weight based upon the combined weight of Components (A), (B), (C) and (D).

The quantity of Component (D) was about 0.71% by weight based upon the combined quantity of Components (A), (B), (C) and (D).

The combined equivalent weight of Components (A) and (B) was about 234.

The resultant mixture was poured into a Mylar ® tray and was observed to suddenly solidify within about 7 minutes and was demolded within about 14 minutes after polyisocyanate addition. The resultant solid, essentially bubble-free casting had the following properties:

| | |
|---|---|
| Density | >1 gram/cc |
| Hardness | 18 Barcol (No. 934-1 tester) |

EXAMPLE 67

The following components were thoroughly blended:

Component (A) — 50 grams of Polyol A

Component (B) — 50 grams of Polyisocyanate A

Component (C) — 40 grams of styrene having an atmospheric boiling point of about 145.2° C. 10 grams of N,N-dimethylaminoethyl methacrylate having a boiling point of about 62°–65° C (6 mm Hg)

Component (D) — 1 cc (1 gram) of tertiarybutyl perbenzoate (denisty = about 1 g/cc)

The NCO:OH equivalent ratio was about 1:1.

The quantity of Component (C) was about 33.11% by weight based upon the combined weight of Components (A), (B), (C) and (D).

The quantity of Component (D) was about 0.66% by weight based upon the combined quantity of Components (A), (B), (C) and (D).

The combined equivalent weight of Components (A) and (B) was about 174.

This blend was cast into a Mylar ® tray set at a slight slant. The thickest part of the casting solidified in less than 5 minutes after addition of the isocyanate and showed an exotherm in excess of 100° C. The casting was demolded in less than 14 minutes after isocyanate addition. The cast sheet was found to have a density greater than 1.0 g/cc. The thicker portion of the casting, having a thickness of about 3/16-inches showed a Barcol Hardness (No. 935 tester) of 90 units and was rigid, but the thin edge of the casting measuring about 1/32-inch to about 1/16-inch was soft and flexible, showing a Barcol Hardness (No. 935 tester) of less than 2 units.

EXAMPLE 68

The following components were thoroughly blended:

Component (A) — 60 grams of Polyol B

Component (B) — 30 grams of Polyisocyanate A

Component (C) — 30 grams of 1,3-butylenedimethacrylate having an atmospheric boiling point in excess of 150° C. 30 grams of N,N-dimethylaminoethyl methacrylate having a boiling point of about 62°–65° C (6 mm Hg)

Component (D) — 1 cc (1 gram) of tertiarybutylperoxy isopropyl carbonate (density = about 1 g/cc)

The NCO:OH equivalent ratio was about 0.92:1.

The quantity of Component (C) was about 39.74% by weight based upon the combined weight of Components (A), (B), (C) and (D).

The quantity of Component (D) was about 0.66% by weight based upon the combined quantity of Components (A), (B), (C) and (D).

The combined equivalent weight of Components (A) and (B) was about 248.

The resultant mixture was poured into a Mylar ® tray and was observed to suddenly solidify within about 60 seconds and was demolded within about 4 minutes after polyisocyanate addition. The maximum exotherm temperature was above about 120° C. The resultant solid, essentially bubble-free casting had the following properties:

| | |
|---|---|
| Density | >1 gram/cc |
| Hardness | 35-40 Barcol (No. 934-1 tester) |

EXAMPLE 69

The following components were thoroughly blended:

Component (A) — 60 grams of Polyol B

Component (B) — 60 grams of Polyisocyanate G (added in a molten state)

Component (C) — 20 grams of styrene having an atmospheric boiling point of about 145.2° C 30 grams of N,N-dimethylaminoethyl methacrylate having a boiling point of about 62°–65° C (6 mm Hg)

Component (D) — 1 cc (1 gram) of tertiarybutyl perbenzoate (density = about 1 g/cc)

The NCO:OH equivalent ratio was about 1.3:1.

The quantity of Component (C) was about 29.24% by weight based upon the combined weight of Components (A), (B), (C) and (D).

The quantity of Component (D) was about 0.58% by weight based upon the combined quantity of Components (A), (B), (C) and (D).

The combined equivalent weight of Components (A) and (B) was about 311.

The resultant mixture was poured into a Mylar ® tray and was observed to suddenly solidify within about 60 seconds and was demolded within about 7 minutes after polyisocyanate addition. The maximum exotherm temperature was above about 100° C. The resultant solid, essentially bubble-free casting had the following properties:

| | |
|---|---|
| Density | >1 gram/cc |
| Hardness | 13 Barcol (No. 934-1 tester) |

EXAMPLE 70

Fabrication of a chair leg (solid tapered cylinder, maximum diameter — 2 inches; minimum diameter 1½ in.) Blended:

| | |
|---|---|
| Vinyl toluene | 30 parts |

-continued

| | |
|---|---|
| Polyisocyanate C | 46 parts |
| Polyol A | 30 parts |
| Tertiarybutyl perbenzoate | 0.4 parts |
| Lead Octoate (24% lead by weight) | 0.4 parts |

This blend was cast into a polyethylene mold (tapered cylinder); blend solidified in less than 45 seconds after catalyst addition. A cylindrical chair leg was demolded in less than 90 seconds after catalyst addition. This chair leg was ready for use with no additional curing.

EXAMPLE 71

Fabrication of an Ornamental Horse's Head (Relief)

A formulation was blended identical to that in Example 70 and this blend was cast into a polyethylene mold of a horse's head in relief. An ornamental horse's head was demolded in less than 2 minutes after catalyst addition. Maximum thickness of casting was approximately ⅜-inch thick.

EXAMPLE 72

Fabrication of a standard thread pipe plug

An elastomeric silicone (polysiloxane) composition was poured around a nominal 2½-inch threaded malleable iron pipe plug and this elastomer was cured by conventional techniques to yield an elastomeric mold of the desired pipe fitting. Then a blend identical of Example 70 was poured into this mold. The solidified resin pipe plug was removed from the silicone mold in less than 3 minutes after addition of the catalyst to this blend.

EXAMPLE 73

Fabrication of a Spur Gear

A 3-inch diameter spur gear was removed from a gear box having a gear and pinion arrangement. An elastomeric silicone mold of this spur gear was prepared. A blend identical to Example 70 was poured into this mold. This blend solidified in less than 45 seconds after catalyst addition and a resin spur gear was removed from the elastomeric mold in less than 3 minutes after catalyst addition and was ready for use with no further need of curing.

EXAMPLE 74

The following components were thoroughly blended:

Component A:

40 grams of Polyol A.

Component B:

40 grams of Polyisocyanate A.

Component C:

60 grams of Styrene having an atmospheric boiling point of about 145.2° C.

Component D:

1 cc (1 gram) of tertiarybutyl perbenzoate (density = about 1 g/cc).

Component E:

.025 cc (0.29 gram) of lead octoate (24% lead by weight; density = about 1.14 g/cc).

Component F:

none

Component G:

(1) 20 grams of powdered epsom salts ($MgSO_4.7H_2O$)

(2) 2 grams of DC 193 silicone oil commercially available from Dow Corning Corp.

The NCO:OH equivalent ratio was about 1:1.

The quantity of Component (C) was about 42.47% by weight based upon the combined weight of Components (A), (B), (C), (D) and (E).

The quantity of Component (D) was about 0.71% by weight based upon the combined weight of Components (A), (B), (C), (D) and (E).

The quantity of Component (C) was about 0.21% by weight based upon the combined quantity of Components (A), (B), (C), (D) and (E).

The combined equivalent weight of Components (A) and (B) was about 174.

The resultant mixture was poured into a 1 quart (0.946 liter) paper carton and was observed to rise and set to a tack free state within about 120 seconds and was demolded within about 10 minutes after catalyst addition. The resultant rigid foam product having substantially uniform cells had a density of 0.21 grams/cc (13.11 lbs/ft³).

EXAMPLE 75

The following components were thoroughly blended:

Component A:

40 grams of Polyol A.

Component B:

40 grams of Polyisocyanate A.

Component C:

60 grams of vinyl toluene having an atmospheric boiling point of about 167° C.

Component D:

0.5 gram of azobisisobutyronitrile.

Component E:

0.2 gram of lead octoate (24% lead by weight).

Component F:

none

Component G:

(1) 5 grams of trichloromonofluoromethane.

(2) 1 gram of DC-193 silicone oil commercially available from Dow Corning Corp.

The NCO:OH equivalent ratio was about 1:1.

The quantity of Component (C) was about 42.64% by weight based upon the combined weight of Components (A), (B), (C), (D) and (E).

The quantity of Component (D) was about 0.36% by weight based upon the combined quantity of Components (A), (B), (C), (D) and (E).

The quantity of Component (E) was about 0.14% by weight based upon the combined quantity of Components (A), (B), (C), (D) and (E).

The combined equivalent weight of components (A) and (C) was about 174.

The resultant mixture was poured into a one quart (0.946 liter) paper carton and was observed to rise to its seemingly fullest extent to a tack free condition within about 120 seconds and was demolded within about 6 minutes after catalyst addition. The maximum exotherm was observed to exceed 120° C. About 7 minutes after catalyst addition, the foamed mass weighed about 147 grams and after 24 hours, it weighed about 145 grams. The resultant rigid foam having substantially uniform cells had a density of 0.26 grams/cc (16.23 lbs/ft³).

EXAMPLE 76

The following components were thoroughly blended:

Component A:

40 grams of Polyol A.

Component B:

40 grams of Polyisocyanate A.

Component C:

55 grams of styrene having an atmospheric boiling point of about 145.2° C.

Component D:

0.5 gram of azobisisobutyronitrile.

Component E:

0.2 gram of lead octoate (24% by weight lead).

Component F:

none

Component G:

(1) 5 grams of vinyl acetate (boiling point of about 73° C).

(2) 2 grams of DC-193 silicone oil commercially available from Dow Corning Corp.

The NCO:OH equivalent ratio was about 1:1.

The quantity of Component (C) was about 40.53% by weight based upon the combined weight of Components (A), (B), (C), (D) and (E).

The quantity of Component (D) was about 0.37% by weight based upon the combined quantity of Components (A), (B), (C), (D) and (E).

The quantity of Component (E) was about 0.15% by weight based upon the combined quantity of Components (A), (B), (C), (D) and (E).

The combined equivalent weight of Components (A) and (B) was about 174.

The resultant mixture was poured into a 1 quart (0.946 liter) paper carton and was observed to rise to its fullest extent to a tack free condition within about 120 seconds and was demolded within about 10 minutes after catalyst addition. The maximum exotherm temperature was observed to be in excess of 120° C. The resultant rigid foam, having substantially uniform cells had a density of 0.35 grams/cc (21.85 lbs/ft$^3$).

EXAMPLE 77

The following components were thoroughly blended:

Component A:

30 grams of Polyol H.

Component B:

35 grams of Polyisocyanate A.

Component C:

60 grams of styrene having an atmospheric boiling point of about 145.2° C.

Component D:

0.2 gram of azobisisobutyronitrile.

Component E:

none (not required since Component (A) was an amine initiated polyol).

Component F:

none

Component G:

(1) 5 grams of trichloromonofluoromethane (2) 2 grams of DC-193 silicone oil commercially available from Dow Corning Corp.

The NCO:OH equivalent ratio was about 1.08:1.

The quantity of Component (C) was about 47.92% by weight based upon the combined weight of Components (A), (B), (C) and (D).

The quantity of Component (D) was about 0.16% by weight based upon the combined quantity of Components (A), (B), (C) and (D).

The combined equivalent weight of components (A) and (B) was about 168.

The resultant mixture was poured into a one quart (0.946 liter) paper carton and was observed to rise to its fullest extent within about 90 seconds and was demolded within about 5 minutes after catalyst addition. The maximum exotherm temperature exceeded 120° C. The resultant rigid tack free foam having essentially uniform cells had a density of 0.22 grams/cc (13.73 lbs/ft$^3$).

EXAMPLE 78

The following components were thoroughly blended:

Component A:

30 grams of Polyol A.

Component B:

60 grams of Polyisocyanate A.

Component C:

60 grams of styrene having an atmospheric boiling point of about 145.2° C.

Component D:

0.4 gram of azobisisobutyronitrile.

Component E:

0.4 gram of dibutyltin dilaurate. 0.5 cc (0.52 grams) of a 33% solution of triethylene diamine in dipropylene glycol having a density of about 1.04 g/cc (0.17 g of catalyst).

Component F:

none

Component G:

(1) 2.5 grams of water (2) 2 grams of DC-193 silicone fluid commercially available from Dow Corning Corp.

The NCO:OH equivalent ratio of B:A was about 1.21:1 (excluding NCO equivalents required for the water, 0.28 equiv.).

The quantity of Component (C) was about 39.74% by weight based upon the combined weight of Components (A), (B), (C), (D) and (E).

The quantity of Component (D) was about 0.26% by weight based upon the combined quantity of Components (A), (B), (C), (D) and (E).

The quantity of Component (E) was about 0.38% by weight based upon the combined quantity of Components (A), (B), (C), (D) and (E).

The combined equivalent weight of components (A) and (B) was about 174.

The resultant mixture was poured in a one-half gallon (1.89 liter) paper carton and was observed to rise to its fullest extent within about 300 seconds and was demolded within about 10 minutes after catalyst addition. The resultant rigid foam having essentially uniform cells had a density of 0.031 grams/cc (1.94 lbs/ft$^3$).

EXAMPLE 79

The following components were thoroughly blended:

Component A:

30 grams of Polyol A.

Component B:

55 grams of Polyisocyanate C.

Component C:

60 grams of styrene having an atmospheric boiling point of about 145.2° C.

Component D:

0.2 gram of azobisisobutyronitrile.

Component E:

2 cc (2.08 grams) of a 33% solution of triethylene diamine in dipropylene glycol (density = 1.04 g/cc) (0.69 grams of catalyst).

Component F:

none

Component G:

(1) 15 grams of trichloromonofluoromethane.

(2) 2 grams of DC-193 silicone fluid commercially available from Dow Corning Corp.

The NCO:OH equivalent ratio was about 1.21:1.

The quantity of Component (C) was about 41.13% by weight based upon the combined weight of Components (A), (B), (C), (D) and (E).

The quantity of Component (D) was about 0.14% by weight based upon the combined quantity of Components (A), (B), (C), (D), and (E).

The quantity of Component (E) was about 0.47% by weight based upon the combined quantity of Components (A), (B), (C), (D) and (E).

The combined equivalent weight of components (A) and (B) was about 221.

The resultant mixture was poured into a 1 quart (0.946 liter) paper carton and was observed to rise to its fullest extent within about 240 seconds and was demolded within about 10 minutes after catalyst addition. The maximum exotherm temperature exceeded 120° C. The resultant solid tack free foam having essentially uniform cells had a density of 0.16 grams/cc (9.9 lbs/ft$^3$).

EXAMPLE 80

The following components were thoroughly blended:

Component A:

40 grams of Polyol A.

Component B:

40 grams of Polyisocyanate A.

Component C:

40 grams of styrene having an atmospheric boiling point of about 145.2° C.

Component D:

1 l cc (1 gram) of tertiary butyl perbenzoate (density = about 1 g/cc).

Component E:

1 cc (1.04 grams) of a 33% solution of triethylene diamine in dipropylene glycol, density = about 1.04 g/cc (0.34 grams of catalyst).

Component F:

none

Component G:

(1) 10 grams of trichloromonofluoromethane.

(2) 2 grams of DC-193 silicone fluid commercially available from Dow Corning Corp.

The NCO:OH equivalent ratio was about 1:1.

The quantity of Component (C) was about 32.97% by weight based upon the combined weight of Components (A), (B), (C), (D) and (E).

The quantity of Component (D) was about 0.82% by weight based upon the combined quantity of Components (A), (B), (C), (D) and (E).

The quantity of Component (E) was about 0.28% by weight based upon the combined quantity of Components (A), (B), (C), (D) and (E).

The combined equivalent weight of components (A) and (B) was about 174.

The resultant mixture was poured into a 1 quart (0.946 liter) paper carton and was observed to rise to its fullest extent within about 150 seconds and was demolded within about 10 minutes after catalyst addition. The maximum exotherm temperature exceeded 100° C. The resultant rigid tack free foam having essentially uniform cells had a density of 0.078 gram/cc (4.87 lbs/ft$^3$).

EXAMPLE 81

The following components were thoroughly blended:

Component A:

60 grams of Polyol B.

Component B:

30 grams of Polyisocyanate A.

Component C:

50 grams of styrene having an atmospheric boiling point of about 145.2° C.

10 grams of a mixture of 55% divinylbenzene and 45% ethylvinylbenzene having an atmospheric boiling point of about 195° C.

Component D:

0.4 gram of azobisisobutyronitrile.

Component E:

2 cc (2.08 grams) of a 33% solution of triethylene diamine in dipropylene glycol, density = about 1.04 g/cc (0.69 gram of catalyst).

Component F:

none

Component G:

(1) 10 grams of trichloromonofluoromethane.

(2) 2 grams of DC 193 silicone fluid commercially available from Dow Corning Corp.

The NCO:OH equivalent ratio was about 0.92:1.

The quantity of Component (C) was about 39.71% by weight based upon the combined weight of Components (A), (B), (C), (D) and (E).

The quantity of Component (D) was about 0.26% by weight based upon the combined quantity of Components (A), (B), (C), (D) and (E).

The quantity of Component (E) was about 0.46% by weight based upon the combined quantity of Components (A), (B), (C), (D) and (E).

The combined equivalent weight of components (A) and (B) was about 248.

The resultant mixture was poured into a 1 quart (0.946 liter) paper carton and was observed to rise to its fullest extent within about 150 seconds and was demolded within about 10 minutes after the catalyst addition. The maximum exotherm temperature was observed to be in excess of 120° C. The resultant rigid foam having substantially uniform cells had a density of 0.17 grams/cc (10.61 lbs/ft$^3$).

EXAMPLE 82

The following components were thoroughly blended:

Component A:

40 grams of Polyol A.

Component B:

40 grams of Polyisocyanate A.

Component C:

40 grams of styrene having an atmospheric boiling point of about 145.2° C.

Component D:

1 cc (1 gram) of tertiarybutyl perbenzoate (density = 1 g/cc).

Component E:

2 grams of dibutyltin dilaurate.

Component F:

none

Component G:

(1) 10 grams of diatomaceous earth having a surface area of 2.5 m$^2$/gram (2) none The NCO:OH equivalent ratio was about 1:1.

The quantity of Component (C) was about 35.52% by weight based upon the combined weight of Components (A), (B), (C), (D) and (E).

The quantity of Component (D) was about 0.81% by weight based upon the combined quantity of Components (A), (B), (C), (D) and (E).

The quantity of Component (E) was about 1.63% by weight based upon the combined quantity of Components (A), (B), (C), (D) and (E).

The combined equivalent weight of components (A) and (B) was about 174.

The resultant mixture was poured into a 1 quart (0.946 liter) paper carton and was observed to rise and set into a tack free product within about 120 seconds and was demolded within about 3 minutes after catalyst addition. The maximum exotherm temperature was observed to be in excess of 140° C. The resultant rigid foam having substantially uniform cells had a density of 0.3 grams/cc (18.73 lbs/ft$^3$).

EXAMPLE 83

The following components were thoroughly blended:

Component A:
40 grams of Polyol A.

Component B:
40 grams of Polyisocyanate A.

Component C:
40 grams of trimethylolpropane trimethacrylate having an atmospheric boiling point above about 185° C.

Component D:
1 cc (1 gram) of tertiarybutyl perbenzoate (density = 1 g/cc).

Component E:
0.5 cc (0.57 gram) of lead octoate containing 24% lead by weight (density = 1.14 g/cc).

Component F:
none

Component G:
(1) 10 grams of trichloromonofluoromethane
(2) 2 grams of DC-195 a silicone oil commercially available from Dow Corning Corp.

The NCO:OH equivalent ratio was about 1:1.

The quantity of Component (C) was about 32.9% by weight based upon the combined weight of Components (A), (B), (C), (D) and (E).

The quantity of Component (D) was about 0.82% by weight based upon the combined quantity of Components (A), (B), (C), (D) and (E).

The quantity of Component (E) was about 0.47% by weight based upon the combined quantity of Components (A), (B), (C), (D) and (E).

The combined equivalent weight of components (A) and (B) was about 174.

The resultant mixture was poured into a 1 quart (0.946 liter) paper carton and was observed to rise to its fullest extent within about 12 seconds and was demolded within about 10 minutes after catalyst addition. The maximum exotherm temperature was observed to exceed 120° C. The resultant rigid foam having essentially uniform cells had a density of 0.16 grams/cc (9.98 lbs/ft$^3$).

EXAMPLE 84

The following components were thoroughly blended:

Component (A) — 90 grams of Polyol L
Component (B) — 60 grams of Polyisocyanate C
Component (C) — 40 grams of styrene having an atmospheric boiling point of about 145.2° C
Component (D) — 1 cc (1 gram) tertiarybutyl perbenzoate (density = about 1 g/cc)
Component (E) — 1 cc (1.27 grams) stannous octoate having a density of about 1.27 g/cc commercially available from M&T Chemical Co. as T-9.

The NCO:OH ratio was about 0.98:1.

The quantity of Component (C) was about 20.8% by weight based upon the combined weight of Components (A), (B), (C), (D) and (E).

The quantity of Component (D) was about 0.52% by weight based upon the combined quantity of Components (A), (B), (C), (D) and (E).

The quantity of Component (E) was about 0.66% by weight based upon the combined quantity of Components (A), (B), (C), (D) and (E).

The combined equivalent weight of Components (A) and (B) was about 331.

The resultant mixture was poured into a Mylar® tray and was observed to suddenly solidify within about 3 minutes and was demolded within about 6 minutes after catalyst addition. The peak exotherm was observed to be in excess of 100° C. The resultant, dark, rigid, bubble-free casting had the following properties:

| | |
|---|---|
| Density | >1 g/cc |
| Hardness | 95 Barcol (#935 tester) |

EXAMPLE 85

The following components were thoroughly blended:

Component (A) — 60 grams of Polyol M
Component (B) — 60 grams of Polyisocyanate C
Component (C) — 60 grams of styrene having an atmospheric boiling point of about 145.2° C
Component (D) — 1 cc (1 gram) of tertiarybutyl perbenzoate having a density of about 1 g/cc.
Component (E) — 5 grams of a 33% solution of triethylenediamine in dipropylene glycol (1.65 grams of catalyst)

The NCO:OH equivalent ratio was about 1.04:1.

The quantity of Component (C) was about 32.85% by weight based upon the combined quantity of Components (A), (B), (C), (D) and (E).

The quantity of Component (D) was about 0.55% by weight based upon the combined quantity of Components (A), (B), (C), (D) and (E).

The quantity of Component (E) was about 0.9% by weight based upon the combined quantity of Components (A), (B), (C), (D) and (E).

The combined equivalent weight of Components (A) (B) was about 274.

The resultant mixture was poured into a Mylar® tray and was observed to suddenly solidify within about 60 seconds and was demolded within about 10 minutes after catalyst addition. The peak exotherm was in excess of 100° C. The resultant rigid, bubble-free cast sheet had the following properties:

| | |
|---|---|
| Density | 1 g/cc |
| Hardness | 90 Barcol (#935 tester) |

COMPARATIVE EXPERIMENT S (polyol possessed an equivalent weight above 250)

The following components were thoroughly blended:

Component (A) — 70 grams Polyol N
Component (B) — 11 grams Polyisocyanate C
Component (C) — 50 grams of styrene having an atmospheric boiling point of about 145.2° C
Component (D) — 1 cc (1 gram) tertiarybutyl perbenzoate having a density of about 1 g/cc Component (E) — 1 cc (1.27 grams) stannous octoate having a density of about 1.27 g/cc commercially available from M&T Chemical Co. as T-9.

The NCO:OH equivalent ratio was about 1.14:1.

The quantity of Component (C) was about 37.52% based upon the combined quantity of Components (A), (B), (C), (D) and (E).

The quantity of Component (D) was about 0.75% based upon the combined quantity of Components (A), (B), (C), (D) and (E).

The quantity of Component (E) was about 0.95% based upon the combined quantity of Components (A), (B), (C), (D) and (E).

The resultant mixture was poured into a Mylar® tray. The peak exotherm was observed to be <40° C. The resultant casting did not possess sufficient integrity to permit demolding at 75 minutes after catalyst addition.

EXAMPLE 86

The following components were thoroughly blended:

Component (A) — 50 grams of Polyol A

Component (B) — 50 grams of Polyisocyanate A

Component (C) — 50 grams of styrene having an atmospheric boiling point of about 145.2° C Component (D) — 1 cc (1 gram) tertiarybutyl perbenzoate having a density of about 1 g/cc Component (E) — 0.2 cc (0.23 gram) of lead octoate containing 24% lead by weight (density = about 1.14 g/cc)

The above mixture was immediately poured over 35 grams of glass fiber cloth having a surface area of <0.3 $m^2$/gram (Component F) laying in a Mylar® tray.

The NCO:OH equivalent ratio was about 1:1.

The quantity of Component (C) was about 33.06% based upon the combined quantity of Components (A), (B), (C), (D) and (E).

The quantity of Component (D) was about 0.66% based upon the combined quantity of Components (A), (B), (C), (D) and (E).

The quantity of Component (E) was about 0.15% based upon the combined quantity of Components (A), (B), (C), (D) and (E).

The combined quantity of Components (C) and (F) was about 45.95% based upon the combined quantity of Components (A), (B), (C) and (F).

The combined equivalent weight of Components (A) and (B) was about 174.

Excellent wetting was observed to occur between the glass fibers and the fluid mixture. Sudden solidification was observed within about 60 seconds and the resultant casting was removed from the mold within about 6 minutes after catalyst addition. The resultant solid, rigid, bubble-free casting had the following properties.

| | |
|---|---|
| Density | 1 g/cc |
| Tensile Strength | 19429 psi (1365 kg/cm$^2$) |
| % Elongation | 13 |
| Hardness | 30 Barcol (#934-1 tester) |

COMPARATIVE EXPERIMENT T

The following components were thoroughly blended:

50 grams of Polyol A 75 grams of Polyisocyanate B 50 grams of polystyrene granules which pass through a ⅛-inch square opening and have a surface area of <0.3 $m^2$/gram commercially available from The Dow Chemical Company as Styron® 666.

1 cc (1.14 grams) of lead octoate, 24% lead by weight, having a density of about 1.14 g/cc.

The resultant mixture was poured into a Mylar® tray and was observed to suddenly solidify within about 30 seconds after catalyst addition. The resultant solid, rigid bubble-free product had the following properties:

| | |
|---|---|
| Density | >1 g/cc |
| Tensile strength | 1374 psi (96.59 kg/cm$^2$) |
| Elongation | 3% |

A portion of the sheet prepared as above was immersed into a container of trichlorobenzene. After about 15 minutes the polystyrene granules readily leached out of the cast sheet and the surface was observed to be tacky.

By comparison, a portion of a sheet prepared as in Example 1 (an example of the present invention) was immersed in a container of trichlorobenzene and after about 15 minutes no substantial leaching had occurred and no tackiness was detected on the surface of the sheet.

EXAMPLE 87

The following components were thoroughly blended:

Component (A) — 30 grams of Polyol A

Component (B) — 30 grams of Polyisocyanate A

Component (C) — 30 grams of styrene having an atmospheric boiling point of about 145.2° C Component (D) — 0.5 cc (0.5 gram) of tertiarybutyl perbenzoate having a density of about 1 g/cc Component (E) — 0.5 cc (0.57 gram) of lead octoate containing 24% lead by weight (density = about 1.14 g/cc)

Component (F) — 10 grams of a copolymer of 56% by weight ethylene and 44% by weight vinyl acetate having a solubility parameter of about 8.5, a grease melt index of about 13 and a specific heat value of about 0.4 cal/g/° C.

The NCO:OH equivalent ratio was about 1:1.

The quantity of Component (C) was about 32.94% by weight based upon the combined quantity of Components (A), (B), (C), (D) and (E).

The quantity of Component (D) was about 0.55% by weight based upon the combined quantity of Components (A), (B), (C), (D) and (E).

The quantity of Component (E) was about 0.63% by weight based upon the combined quantity of Components (A), (B), (C), (D) and (E).

The combined equivalent weight of Components (A) and (B) was about 174.

The resultant mixture was poured into a Mylar® tray and was observed to suddenly solidify within about 60 seconds and was demolded within about 4 minutes after catalyst addition. The peak exotherm was in excess of 140° C. The resultant rigid, bubble-free cast sheet has the following properties:

| | |
|---|---|
| Density | >1 g/cc |
| Hardness | >90 Barcol (#935 tester) |

We claim:

1. A non-cellular polyurethane/vinyl polymer composite article which (I) has a density of at least about 1 g/cc, (II) has a percent elongation of less than about 100 and (III) can be demolded and used for its intended purpose, after cooling to a suitable handling temperature, within a period of about 15 minutes or less without the application of an external source of heat after admixture of the components forming said article; said article resulting after admixture of the components of a composition which comprises:

(A) a liquid polyol, or mixture of such polyols having from about 2 to about 8 hydroxyl groups and an OH equivalent weight of from about 30 to about 250;

(B) an organic polyisocyanate or mixture of such polyisocyanates having an NCO equivalent weight of less than about 300, with the proviso that when Component (A) has an average of about 2 hydroxyl groups per molecule, said polyisocyanate or polyisocyanate mixture has an average of at least about 2.5 NCO groups per molecule;

(C) from at least about 15% to less than about 65% by weight of the combined weight of Components (A), (B), (C), (D) and (E) of a polymerizable ethylenically unsaturated monomer having an atmospheric boiling point above about 80° C or mixtures of such monomers;

(D) an effective quantity of a catalyst for polymerizing Component (C);

(E) an effective quantity of a catalyst for urethane formation such that the composition reaches an exotherm temperature of at least about 80° C; and (F) from 0 to about 50% by weight based upon the combined weight of Components (A), (B), (C), (D), (E) and (F) of a modifier substance free from groups reactive with Components (A), (B), or (C) at the conditions employed herein, said modifier substances being selected from the group consisting of (1) liquid substances having an atmospheric boiling point of at least about 150° C;

(2) solid substances having a surface area of less than about 0.8 $m^2$/gram and a particle size such that said substance will pass through a ¼-inch square opening is substantially free of any absorbed or occluded water and will not decompose at a temperature below the maximum exotherm temperature generated by the urethane forming reaction;

(3) polymers of one or more ethylenically unsaturated monomers, said polymers having (a) a molecular weight such that the polymer has a grease melt flow index as determined with a 0.02 inch orifice employing a total weight of 2160 grams at 80° C of from about 1 to about 250 decigrams/minute;

(b) a solubility parameter of at least about 8;

(c) and a specific heat of at least about 0.35 calories/gram/° C; and (4) mixtures thereof; and wherein Components (A) and (B) are present in quantities such that the NCO:OH equivalent ratio is from about 0.75:1 to about 1.5:1 and with the following provisos:

(a) that the urethane exotherm temperature does not greatly exceed the boiling point of the monomer or mixture of monomers employed as Component (C);

(b) that when Component (A) is an amine initiated polyol, Component (E) need not be present;

(c) that when Component (B) is an aromatic polyisocyanate and Component (C) contains a tertiary amino vinyl compound, then Component (E) may be omitted;

(d) that the combined quantity of Components (C) and (F) be less than about 60% by weight based upon the combined weight of Components (A), (B), (C) and (F);

(e) that when Component (F-3) is employed as Component (F), it is employed in quantities of ≦20% by weight of the combined quantities of Components (A), (B) and (F);

(f) that when Component (E) contains only a tertiary aliphatic amine, Component (B) must contain an aromatic polyisocyanate.

2. The composite articles of claim 1 wherein Components (A) and (B) are essentially free from ethylenic unsaturation and are present in quantities such that the NCO:OH ratio is from about 0.95:1 to about 1.2:1 and the equivalent weight of Component (A) is from about 50 to about 200 and the equivalent weight of Component (B) is less than about 250 and wherein Component (C) is essentially free of groups reactive with Components (A) or (B), has an atmospheric boiling point above about 100° C and is present in quantities of from about 20% to about 50% by weight based upon the combined weight of Components (A), (B), (C), (D) and (E).

3. The composite articles of claim 2 wherein Component (C) has an atmospheric boiling point above about 120° C.

4. The composite articles of claim 3 wherein Component (A) is an adduct of glycerine, trimethylolpropane, pentaerythirtol sucrose or mixtures thereof with propylene oxide, ethylene oxide or mixtures thereof.

5. The composite articles of claim 4 wherein Component (A) is an adduct of glycerine with propylene oxide.

6. The composite articles of claim 3 wherein Component (C) contains styrene.

7. The composite articles of claim 3 wherein Component (C) contains a tertiary amino-containing vinyl compound.

8. The composite articles of claim 3 wherein Component (A) contains an amine initiated polyol.

9. A process for preparing a non-cellular polyurethane/vinyl polymer composite article which (I) has a density of at least about 1 g/cc, (II) has a percent elongation of less than about 100 and (III) can be demolded and used for its intended purpose, after cooling to a suitable handling temperature, within a period of about 15 minutes or less without the application of an external source of heat after admixture of the components forming said article, which process comprises:

(I) admixing the components of a composition comprising (A) a liquid polyol, or mixture of such polyols, having from about 2 to about 8 hydroxyl groups and an OH equivalent weight of from about 30 to about 250;

(B) an organic polyisocyanate having an NCO equivalent weight of less than about 300, with the proviso that when Component (A) has an average of about 2 hydroxyl groups per molecule, said polyisocyanate has an average of at least about 2.5 NCO groups per molecule;

(C) from at least about 15% to less than about 65% by weight of the combined weight of Components (A), (B), (C), (D) and (E) of a polymerizable ethylenically unsaturated monomer having an atmospheric boiling point above about 80° C or mixtures of such monomers;

(D) an effective quantity of a catalyst for polymerizing Component (C);

(E) an effective quantity of a catalyst for urethane formation such that the composition reaches an exotherm temperature of at least about 80° C; and (F) from 0 to about 50% by weight based upon the combined weight of Components (A), (B), (C), (D), (E) and (F) of a modifier substance free from groups reactive with Components (A), (B) or (C) at the conditions employed herein, said modifier substances being selected from the group consisting of (1) liquid substances having an atmospheric boiling point of at least about 150° C;

(2) solid substances having a surface area of less than about 0.8 $m^2$/gram and a particle size such that said substance will pass through a ¼-inch square opening is substantially free of any adsorbed or occuluded water and will not decompose at a temperature below the mazimum exotherm temperature generated by the urethane forming reaction;

(3) polymers of one or more ethylenically unsaturated monomers; said polymers having (a) a molecular weight such that the polymer has a grease melt flow index as determined with a 0.02 inch orifice employing a total weight of 2160 grams at 80° C of from about 1 to about 250 decigrams/minute;

(b) a solubility parameter of at least about 8;

(c) and a specific heat of at least about 0.35 calories/gram/° C; and (4) mixtures thereof; and wherein components (A) and (B) are present in quantities such that the NCO:OH equivalent ratio is from about 0.75:1 to about 1.5:1 and with the following provisos:

(a) that the urethane exotherm temperature does not greatly exceed the boiling point of the monomer or mixture of monomers employed as Component (C);

(b) that when Component (A) is an amine initiated polyol, Component (E) need not be present;

(c) that when Component (B) is an aromatic polyisocyanate and Component (C) contains a tertiary amino vinyl compound, then Component (E) may be omitted;

(d) that the combined quantity of Components (C) and (F) be less than about 60% by weight based upon the combined weight of Components (A), (B), (C) and (F);

(e) that when Component (F-3) is employed as Component (F), it is employed in quantities of ≦20% by weight of the combined quantities of Components (A), (B) and (F);

(f) that when Component (E) contains only a tertiary aliphatic amine, Component (B) must contain an aromatic polyisocyanate.

(II) pouring the admixed composition into a suitable mold wherein said composition solidifies within about 15 minutes to a solid having the aforesaid density and elongation; and (III) subsequently demolding the resultant article from the mold.

10. The process of claim 9 wherein Components (A) and (B) are essentially free from ethylenic unsaturation and are present in quantities such that the NCO:OH ratio is from about 0.95:1 to about 1.2:1 and the equivalent weight of Component (A) is from about 50 to about 200 and the equivalent weight of Component (B) is less than about 250 and wherein Component (C) is essentially free of groups reactive with Components (A) or (B), had an atmospheric boiling point above about 100° C and is present in quantities of from about 20% to about 50% by weight based upon the combined weight of Components (A), (B), (C), (D) and (E).

11. The process of claim 10 wherein Component (C) has an atmospheric boiling point above about 120° C.

12. The process of claim 11 wherein Component (A) is an adduct of glycerine, trimethylolpropane, pentaerythritol, sucrose or mixtures thereof with propylene oxide, ethylene oxide or mixtures thereof.

13. The process of claim 12 wherein Component (A) is an adduct of glycerine with propylene oxide.

14. The process of claim 11 wherein Component (C) contains styrene.

15. The process of claim 11 wherein Component (C) contains a tertiary amino-containing vinyl compound.

16. The process of claim 11 wherein Component (A) contains an amine initiated polyol.

17. A cellular polyurethane/vinyl polymer composite article which (I) has substantially uniform cells, (II) has a substantially uniform density of less than 1 g/cc and (III) can be demolded and used for its intended purpose, after cooling to a suitable handling temperature, within a period of about 15 minutes or less without the application of an external source of heat after admixture of the components forming said article;

said article resulting after admixture of the components of a composition which comprises:

(A) a liquid polyol, or mixtures of such polyols, having from about 2 to about 8 hydroxyl groups and an OH equivalent weight of from about 30 to about 250;

(B) an organic polyisocyanate having an NCO equivalent weight of less than about 250, with the proviso that when Component (A) has an average of about 2 hydroxyl groups per molecule, said polyisocyanate has an average of at least about 2.5 NCO groups per molecule;

(C) from at least about 15% to less than about 65% by weight of the combined weight of Components (A), (B), (C), (D) and (E) of a polymerizable ethylenically unsaturated monomer having an atmospheric boiling point above about 80° C or mixtures of such monomers;

(D) an effective quantity of a catalyst for polymerizing Component (C);

(E) an effective quantity of a catalyst for urethane formation such that the composition reaches an exotherm temperature of at least about 80° C; and (F) from 0 to about 50% by weight based upon the combined weight of Components (A), (B), (C), (D), (E) and (F) of a modifier substance free from groups reactive with Components (A), (B), or (C) at the conditions employed herein, said modifier substances being selected from the group consisting of (1) liquid substances having an atmospheric boiling point of at least about 150° C;

(2) solid substances having a surface area of less than about 0.8 $m^2$/gram and a particle size such that said substance will pass through a ¼-inch square opening is substantially free of any absorbed or occluded water and will not decompose at a temperature below the maximum exotherm temperature generated by the urethane forming reaction;

(3) polymers of one or more ethylenically unsaturated monomers, said polymers having (a) a molecular weight such that the polymer has a grease melt flow index as determined with a 0.02-inch orifice employing a total weight of 2160 grams at 80° C of from about 1 to about 250 decigrams/minute;

(b) a solubility parameter of at least about 8;

(c) and a specific heat of at least about 0.35 calories/gram/° C; and (4) mixtures thereof;

(G) a foam-forming system which comprises (1) a foaming agent selected from the group consisting of (a) low boiling vaporizable organic liquids having a boiling point below the reaction exotherm temperature;

(b) substances which decompose theremally to release $CO_2$ or release water vapor at the exotherm temperature;

(c) a solid particulate substance which will pass through a 2 mm square opening and which has a surface area of at least 0.8 $m^2$/gram;

(d) an inorganic metal hydrate characterized as having a solubility in anhydrous ethyl alcohol of less than about 1.2 grams per 100 grams and a weight loss of at least 5% when subjected to a temperature of 115° C for 30 minutes at atmospheric pressure;

(e) water;

(f) mixtures thereof; and (2) a cell control agent;

wherein Components (A) and (B) are present in quantities such that the NCO:OH equivalent ratio is from about 0.75:1 to about 1.5:1, Component (G-1) is present in quantities sufficient to provide the desired density and Component (G-2) is present in quantities sufficient to provide substantially uniform cells; and with the following provisos:

(a) that the urethane exotherm temperature does not greatly exceed the boiling point of the monomer or mixture of monomers employed as Component (C);

(b) that when Component (A) is an amine initiated polyol, Component (E) need not be present;

(c) that when Component (B) is an aromatic polyisocyanate and Component (C) contains a tertiary amino vinyl compound then Component (E) may be omitted;

(d) that the combined quantity of Components (C) and (F) be less than about 60% by weight based upon the combined weight of Components (A), (B), (C) and (F);

(e) that when Component (F-3) is employed as Component (F),, it is employed in quantities of ≦20% by weight of the combined quantities of Components (A), (B) and (F);

(f) that when Component (E) contains only a tertiary aliphatic amine, Component (B) must contain an aromatic polyisocyanate;

(g) that when Comopnent (G-1-c) or (G-1-d) is employed as the blowing agent, Component (G-2) is not required.

18. The composite articles of claim 17 wherein Components (A) and (B) are essentially free from ethylenic unsaturation and are present in quantities such that the NCO:OH ratio is from about 0.95:1 to about 1.2:1 and the equivalent weight of Component (A) is from about 50 to about 200 and the equivalent weight of Component (B) is less than about 250 and wherein Component (C) is essentially free of groups reactive with Components (A) or (B), has an atmospheric boiling point above about 100° C and is present in quantities of from about 20% to about 50% by weight based upon the combined weight of Components (A), (B), (C), (D) and (E).

19. The composite articles of claim 18 wherein Component (C) has an atmospheric boiling point above about 120° C.

20. The composite articles of claim 19 wherein Component (A) is an adduct of glycerine, trimethylolpropane, pentaerythritol, sucrose or mixtures thereof with propylene oxide, ethylene oxide or mixtures thereof.

21. The composite articles of claim 19 wherein Component (A) is an adduct of glycerine with propylene oxide.

22. The composite articles of claim 19 wherein Component (C) contains styrene.

23. The composite articles of claim 19 wherein Component (C) contains a tertiary amino-containing vinyl compound.

24. The composite articles of claim 19 wherein Component (A) contains an amine initiated polyol.

25. A process for preparing a cellular polyurethane/-vinyl polymer composite article which (I) has substantially uniform cells, (II) has a substantially uniform density of less than 1 g/cc and (III) can be demolded and used for its intended purpose, after cooling to a suitable handling temperature, within a period of about 15 minutes or less without the application of an external source of heat after admixture of the components forming said article, which process comprises:

(I) admixing the components of a composition comprising (A) a liquid polyol, or mixture of such polyols having from about 2 to about 8 hydroxyl groups and an OH equivalent wieght of from about 30 to about 250;

(B) an organic polyisocyanate having an NCO equivalent weight of less than about 250, with the proviso that when Component (A) has an average of about 2 hydroxyl groups per molecule, said polyisocyanate has an average of at least about 2.5 NCO groups per molecule;

(C) from at least about 15% to less than about 65% by weight of the combined weight of Components (A), (B), (C), (D) and (E) of a polymerizable ethylenically unsaturated monomer having an atmospheric boiling point above about 80° C or mixtures of such monomers;

(D) an effective quantity of a catalyst for polymerizing Component (C);

(E) an effective quantity of a catalyst for urethane formation such that the composition reaches an exotherm temperature of at least about 80° C; and (F) from 0 to about 50% by weight based upon the combined weight of Components (A), (B), (C), (D), (E) and (F) or a modifier substance free from groups reactive with Components (A), (B), or (C) at the conditions employed herein, said modifier substances being selected from the group consisting of (1) liquid substances having an atmospheric boiling point of at least about 150° C;

(2) solid substances having a surface area of less than about 0.8 $m^2$/gram and a particle size such that said substance will pass through a ¼-inch square opening is substantially free of any absorbed or occluded water and will not decompose at a temperature below the maximum exotherm temperature generated by the urethane forming reaction;

(3) polymers of one or more ethylenically unsaturated monomers, said polymers having (a) a molecular weight such that the polymer has a grease melt flow index as determined with a 0.02-inch orifice employing a total weight of 2160 grams at 80° C of from about 1 to about 250 decigrams/minute;

(b) a solubility parameter of at least about 8;

(c) and a specific heat of at least about 0.35 calories/gram° C; and (4) mixtures thereof;

(G) a foam-forming system which comprises (1) a foaming agent selected from the group consisting of (a) low boiling vaporizable organic liquids having a boiling point below the reaction exotherm temperature;

(b) substances which decompose thermally to release $CO_2$ or release water vapor at the exotherm temperature;

(c) a solid particulate substance which will pass through a 2 mm square opening and which has a surface area of at least $0.8^2$gram;

(d) an inorganic metal hydrate characterized as having a solubility in anhydrous ethyl alcohol of less than about 1.2 grams per 100 grams and a weight loss of at least 5% when subjected to a temperature of 155° C for 30 minutes at atmospheric pressure;

(e) water (f) mixtures thereof; and (2) a cell control agent; and wherein Components (A) and (B) are present in quantities such that the NCO:OH equivalent ratio is from about 0.75:1 to about 1.5:1, Component (G-1) is present in quantities sufficient to provide the desired density and Component (G-2) is present in quantities sufficient to provide substantially uniform cells; and with the following provisos:

(a) that the urethane exotherm temperature does not greatly exceed the boiling point of the monomer or mixture of monomers employed as Component (C);

(b) that when Component (A) is an amine initiated polyol, Component (E) need not be present;

(c) that when Component (B) is an aromatic polyisocyanate and Component (C) contains a tertiary amino vinyl compound then Component (E) may be omitted;

(d) that the combined quantity of Components (C) and (F) be less than about 60% by weight based upon the combined weight of Components (A), (B), (C) and (F);

(e) that when Component (F-3) is employed as Component (F), it is employed in quantities of ≦20% by weight of the combined quantities of Components (A), (B) and (F);

(f) that when Component (E) contains only a tertiary aliphatic amine, Component (B) must contain an aromatic polyisocyanate;

(g) that when Component (G-1-c) or (G-1-d) is employed as the blowing agent, Component (G-2) is not required;

(II) pouring the admixed composition into a suitable mold wherein said composition solidifies within about 15 minutes to a solid having the aforesaid density; and (III) subsequently substantially demolding the resultant article from the mold.

26. The process of claim 25 wherein Components (A) and (B) are essentially free from ethylenic unsaturation and are present in quantities such that the NCO:OH ratio is from about 0.95:1 to about 1.2:1 and the equivalent weight of Component (A) is from about 50 to about 200 and the equivalent weight of Component (B) is les than about 250 and wherein Component (C) is essentially free of groups reactive with Components (A) or (B), has an atmospheric boiling point above about 100° C and is present in quantities of from about 20% to about 50% by weight based upon the combined weight of Components (A), (B), (C), (D) and (E).

27. The process of claim 26 wherein Component (C) has an atmospheric boiling point above about 120° C.

28. The process of claim 27 wherein Component (A) is an adduct of glycerine, trimethylolpropane, pentaerythritol, sucrose or mixtures thereof with propylene oxide, ethylene oxide or mixtures thereof.

29. The process of claim 27 wherein Component (A) is an adduct of glycerine with propylene oxide.

30. The process of claim 27 wherein Component (C) contains styrene.

31. The process of claim 27 wherein Component (C) contains a tertiary amino-containing vinyl compound.

32. The process of claim 27 wherein Component (A) contains an amine initiated polyol.

* * * * *